(12) United States Patent
Yoon et al.

(10) Patent No.: US 10,719,084 B2
(45) Date of Patent: Jul. 21, 2020

(54) METHOD FOR PLATOONING OF VEHICLES AND VEHICLE USING SAME

(71) Applicant: LG ELECTRONICS INC., Seoul (KR)

(72) Inventors: Jaehwan Yoon, Seoul (KR); Hyunho Ki, Seoul (KR); Hansung Kim, Seoul (KR); Suho Park, Seoul (KR); Jaeseung Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/129,491

(22) Filed: Sep. 12, 2018

(65) Prior Publication Data

US 2019/0079540 A1 Mar. 14, 2019

(30) Foreign Application Priority Data

Sep. 13, 2017 (KR) ........................ 10-2017-0117385

(51) Int. Cl.
*G05D 1/02* (2020.01)
*G05D 1/00* (2006.01)
*H04L 12/26* (2006.01)
*H04W 4/40* (2018.01)

(52) U.S. Cl.
CPC ......... *G05D 1/0295* (2013.01); *G05D 1/0027* (2013.01); *G05D 1/0088* (2013.01); *G05D 1/0276* (2013.01); *H04L 43/08* (2013.01); *H04W 4/40* (2018.02); *G05D 2201/0213* (2013.01)

(58) Field of Classification Search
CPC ... B60W 2050/0043; B60W 2050/008; B60W 2550/308; B60W 2550/408; B60W 30/00; B60W 30/16; B60W 30/165; G01S 2013/9325; G05D 1/0027; G05D 1/0088; G05D 1/0276; G05D 1/0287–0297; G05D 2201/0213; G08G 1/095; G08G 1/22
See application file for complete search history.

(56) References Cited

U.S. PATENT DOCUMENTS

| 2009/0079839 | A1 | 3/2009 | Fischer et al. | |
| 2010/0256852 | A1* | 10/2010 | Mudalige | G08G 1/163 701/24 |
| 2013/0079953 | A1* | 3/2013 | Kumabe | G05D 1/024 701/2 |
| 2017/0227972 | A1* | 8/2017 | Sabau | G05D 1/024 |

(Continued)

FOREIGN PATENT DOCUMENTS

| JP | 10-261194 A | 9/1998 |
| JP | 2002-198886 A | 7/2002 |

(Continued)

*Primary Examiner* — Dale Moyer
(74) *Attorney, Agent, or Firm* — Birch, Stewart, Kolasch & Birch, LLP

(57) ABSTRACT

A method and a device for vehicle platooning in which a leader vehicle of a group of vehicles provides a control signal and one or more follower vehicles in the group travel according to the control signal, the method can include determining a communication state of the group of vehicles; and adjusting, by the leader vehicle, a distance between at least two vehicles included in the group of vehicles based on the communication state of the group of vehicles.

16 Claims, 20 Drawing Sheets

(56) References Cited

U.S. PATENT DOCUMENTS

2017/0270785 A1\* 9/2017 Umehara ................. G08G 1/08
2018/0319400 A1\* 11/2018 Kleinau .................. H04W 4/46

FOREIGN PATENT DOCUMENTS

| JP | 2009-239585 A | 10/2009 |
|---|---|---|
| JP | 2012-35819 A | 2/2012 |
| WO | WO 2010/098554 A2 | 9/2010 |
| WO | WO 2016/065055 A1 | 4/2016 |
| WO | WO 2017/022881 A1 | 2/2017 |

\* cited by examiner

FIG. 16
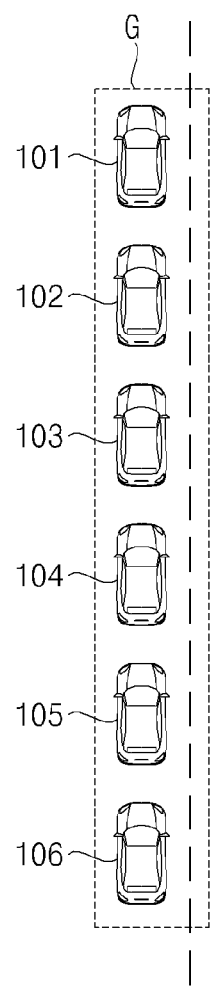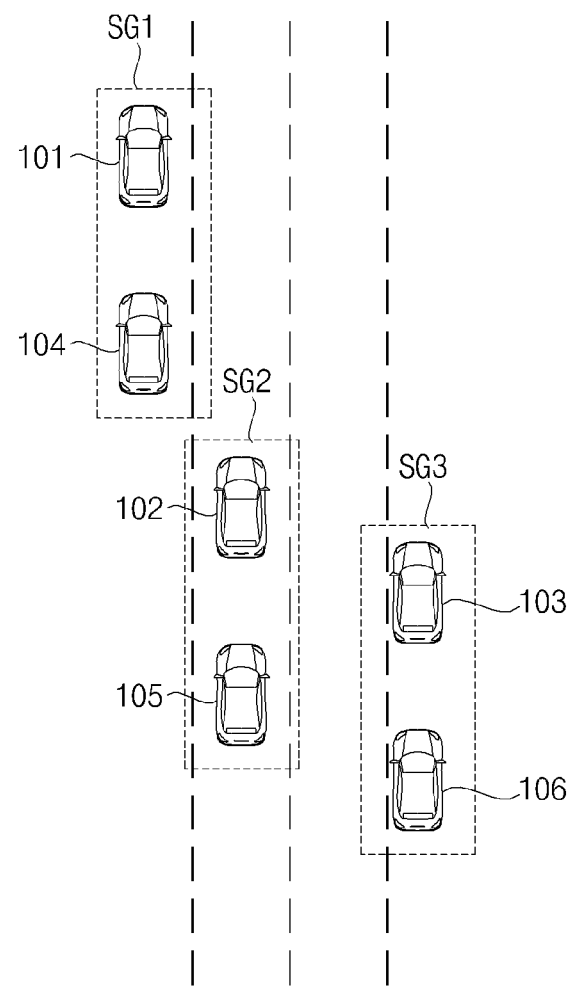
(a)             (b)

METHOD FOR PLATOONING OF VEHICLES AND VEHICLE USING SAME

CROSS-REFERENCE TO RELATED APPLICATIONS

This application claims priority under 35 U.S.C. § 119(a) to Application No. 10-2017-0117385, filed in the Republic of Korea on Sep. 13, 2017, all of which is hereby expressly incorporated by reference into the present application.

BACKGROUND OF THE INVENTION

1. Field of the Invention

The present invention relates to a method for platooning of vehicles and a vehicle using the same, and more particularly, to a method for platooning of vehicles that adjusts a distance between vehicles according to a communication state of platooning vehicles.

2. Description of the Related Art

A vehicle is an apparatus that allows a user who rides therein to drive the apparatus in a desired direction. A representative example of the vehicle may be a car.

In addition, for convenience of the user who uses the vehicle, the vehicle is provided with various sensors and electronic apparatuses. Particularly, for the convenience of the user, research on an advanced driver assistance system (ADAS) has been actively conducted. Furthermore, development of an autonomous vehicle has been actively conducted.

As an autonomous vehicle that autonomously travels is developed, multiple autonomous vehicles may perform platooning in a group.

A single platooning group may include a single leader vehicle that provides a control signal and one or more follower vehicles that are controlled according to the control signal.

The follower vehicles may receive a control signal provided by the leader vehicle in wireless communication. If the communication state between a follower vehicle and the leader vehicle is poor, the speed at which the follower vehicle receives the control signal may be reduced, and a delay may occur in the control of the follower vehicle.

In addition, when the communication state between the follower vehicle and the leader vehicle is poor, the accuracy of control for the follower vehicle may be reduced.

SUMMARY OF THE INVENTION

The present invention has been made in view of the above problems, and provides a method for platooning of vehicles that adjusts a distance between at least two of vehicles in a group according to a communication state of platooning vehicles.

The present invention further provides a method for platooning of vehicles that adjusts platooning area, or the number of platooning vehicles according to a communication state of platooning vehicles.

The problems solved by the present invention are not limited to the above-mentioned problems, and other problems resolved by present invention or advantages of the present invention not mentioned can be clearly understood by those skilled in the art from the following description.

In accordance with an aspect of the present invention, a method of platooning includes: determining a communication state of the group; and adjusting a distance between vehicles included in the group by the leader vehicle, based on the communication state.

According to an embodiment of the present invention, there is one or more of the following effects.

First, it is possible to maintain the safety of the platooning even if the communication state is relatively decreased, by adjusting the interval between the vehicles in the group, the number of the vehicles in the group, and the platooning area according to the communication state.

Second, when the communication state is poor, the vehicles in the group only share the destination and travel individually, so that it is possible to all move to the same destination even in the situation where platooning is difficult.

The effects of the present invention are not limited to the effects mentioned above, and other effects not mentioned can be clearly understood by those skilled in the art from the description of the claims.

BRIEF DESCRIPTION OF THE DRAWINGS

The objects, features and advantages of the present invention will be more apparent from the following detailed description in conjunction with the accompanying drawings, in which:

FIG. 15 and FIG. 16(a)-(b) are diagrams illustrating a process in which a group is divided into a plurality of subgroups according to the communication state of the group, in a platooning method according to an embodiment of the present invention;

DETAILED DESCRIPTION OF THE INVENTION

Description will now be given in detail according to example embodiments disclosed herein, with reference to the accompanying drawings. For the sake of brief description with reference to the drawings, the same or equivalent components can be denoted by the same reference numbers, and description thereof will not be repeated. In general, suffixes such as "module" and "unit" can be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. can be used herein to describe various elements, these elements should not be limited by these terms. These terms are only used to distinguish one element from another.

When an element is referred to as being "connected with" another element, there can be intervening elements present. In contrast, when an element is referred to as being "directly connected with" another element, there are no intervening elements present.

A singular representation may include a plural representation unless context clearly indicates otherwise.

Terms such as "includes" or "has" used herein should be considered as indicating the presence of several components, functions or steps, disclosed in the specification, and it is also understood that more or fewer components, functions, or steps may likewise be utilized.

A vehicle described in this specification may include a car and a motorcycle. Hereinafter, a description will be given based on a car.

Further, a vehicle as described in this specification may include an internal combustion engine vehicle having an engine as a power source, a hybrid vehicle having an engine and an electric motor as a power source, an electric vehicle having an electric motor as a power source, and the like.

In the following description, the left side of the vehicle means the left side in the traveling direction of the vehicle, and the right side of the vehicle means the right side in the traveling direction of the vehicle.

FIGS. 1 to 7 are diagrams illustrating a vehicle according to embodiments of the present invention. Hereinafter, the vehicle according to embodiments of the present invention is explained with reference to FIGS. 1 to 7.

Figure 1:
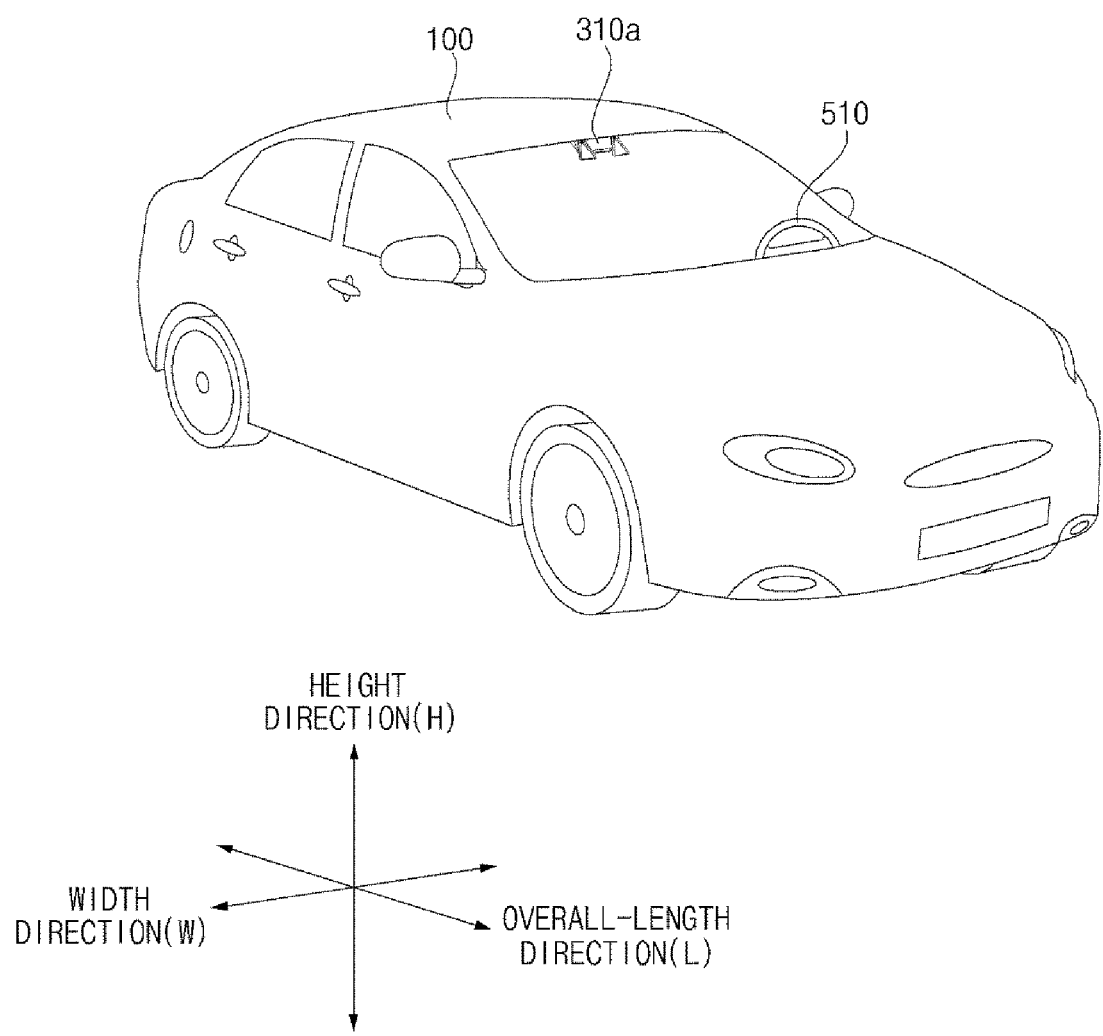
FIG. 1 is a diagram illustrating the external appearance of a vehicle according to an embodiment of the present invention.

FIG. 1 is a diagram illustrating the external appearance of a vehicle according to an embodiment of the present invention.

Figure 2:
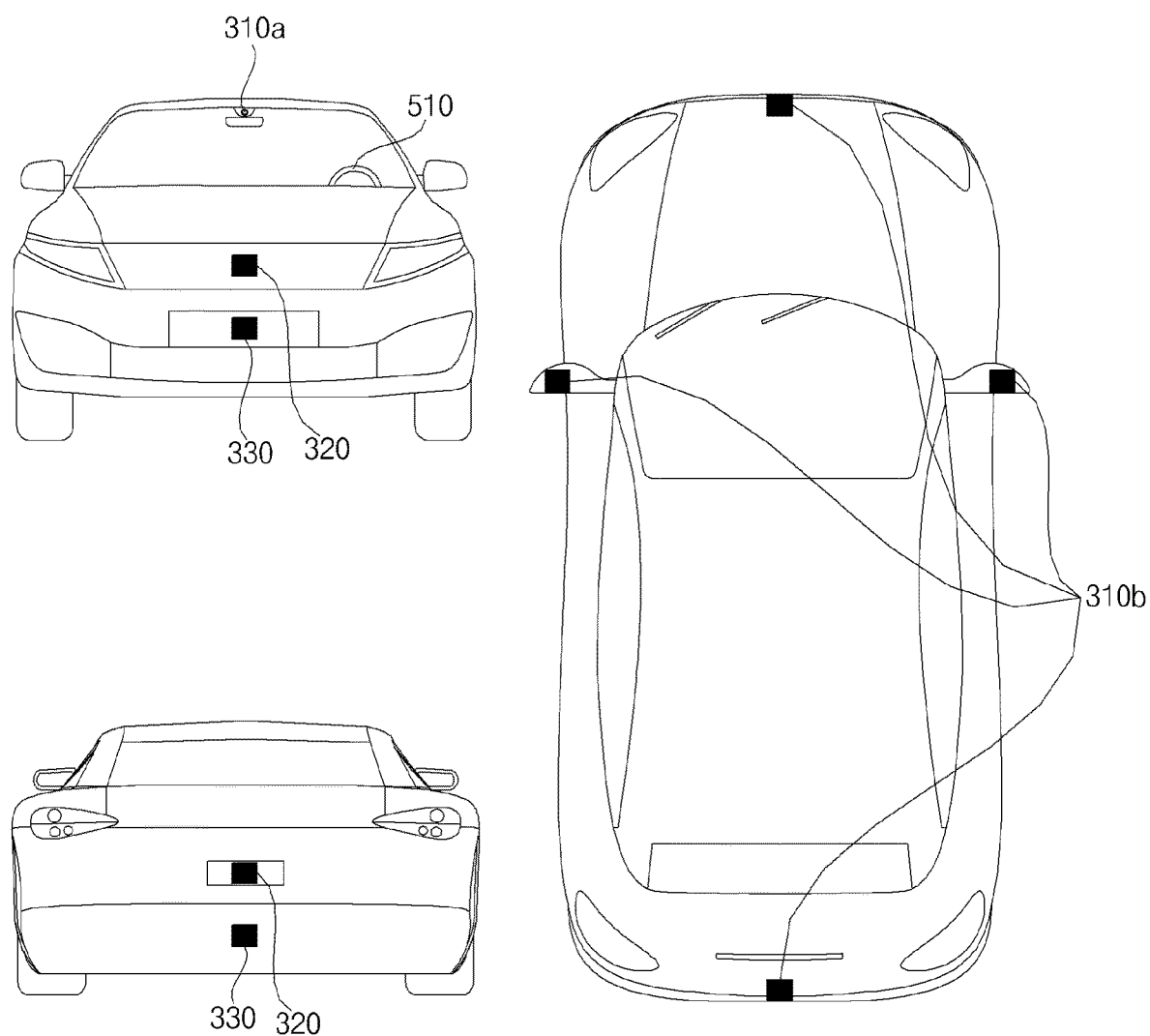
FIG. 2 is a diagram of a vehicle viewed from various angles according to an embodiment of the present invention.

FIG. 2 is a diagram of a vehicle viewed from various angles according to an embodiment of the present invention.

Figure 3:
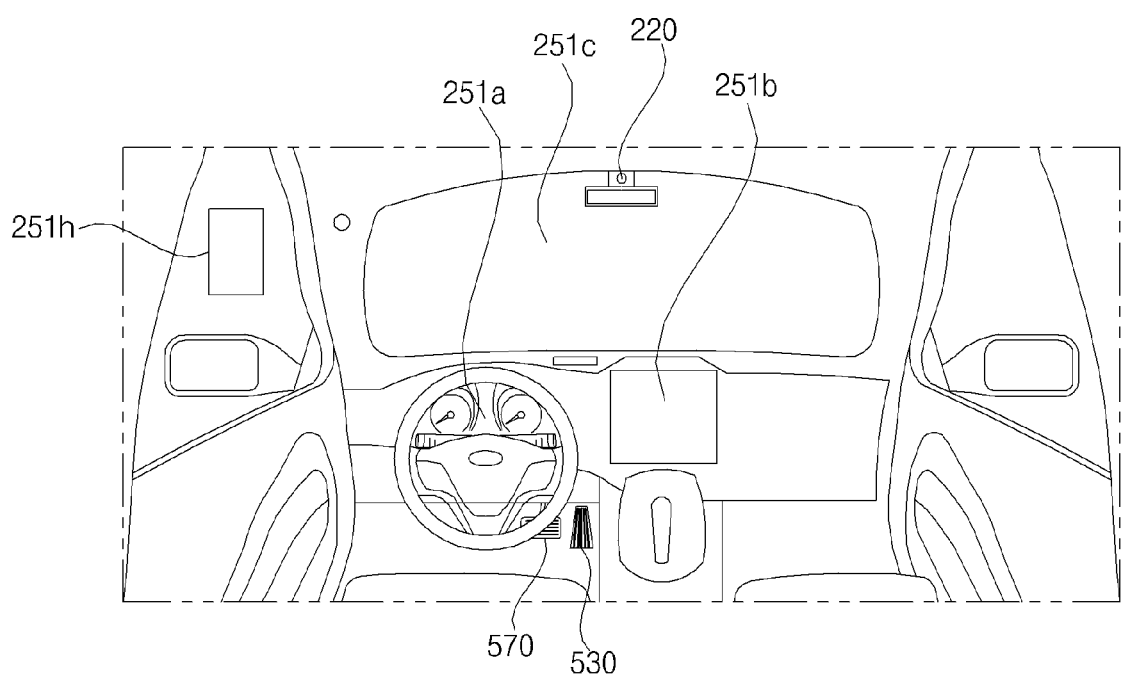
FIG. 3 and FIG. 4 are diagrams illustrating the interior of a vehicle according to an embodiment of the present invention.
Figure 4:
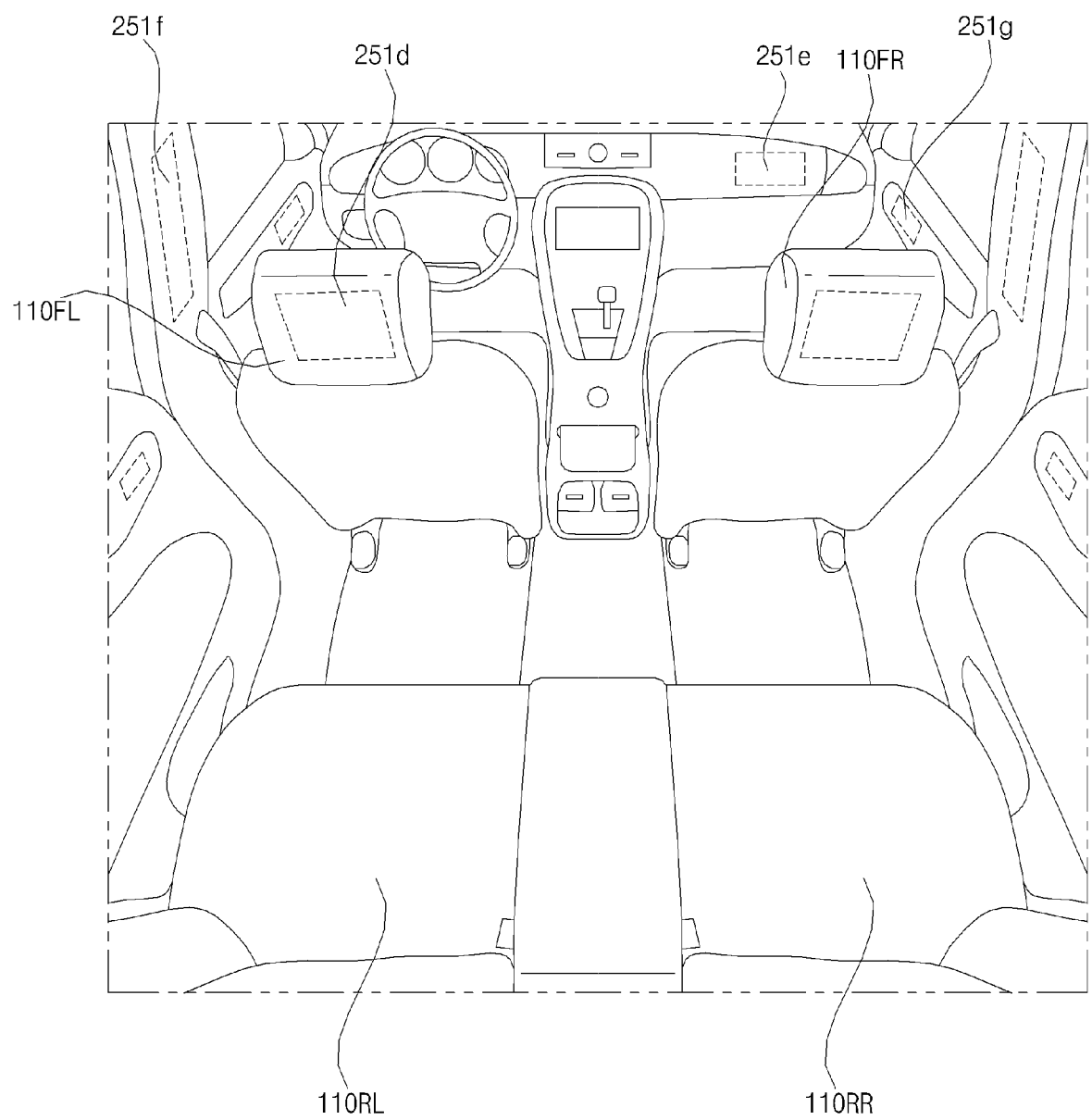

FIG. 3 and FIG. 4 are diagrams illustrating the interior of a vehicle according to the embodiment of the present invention.

Figure 5:
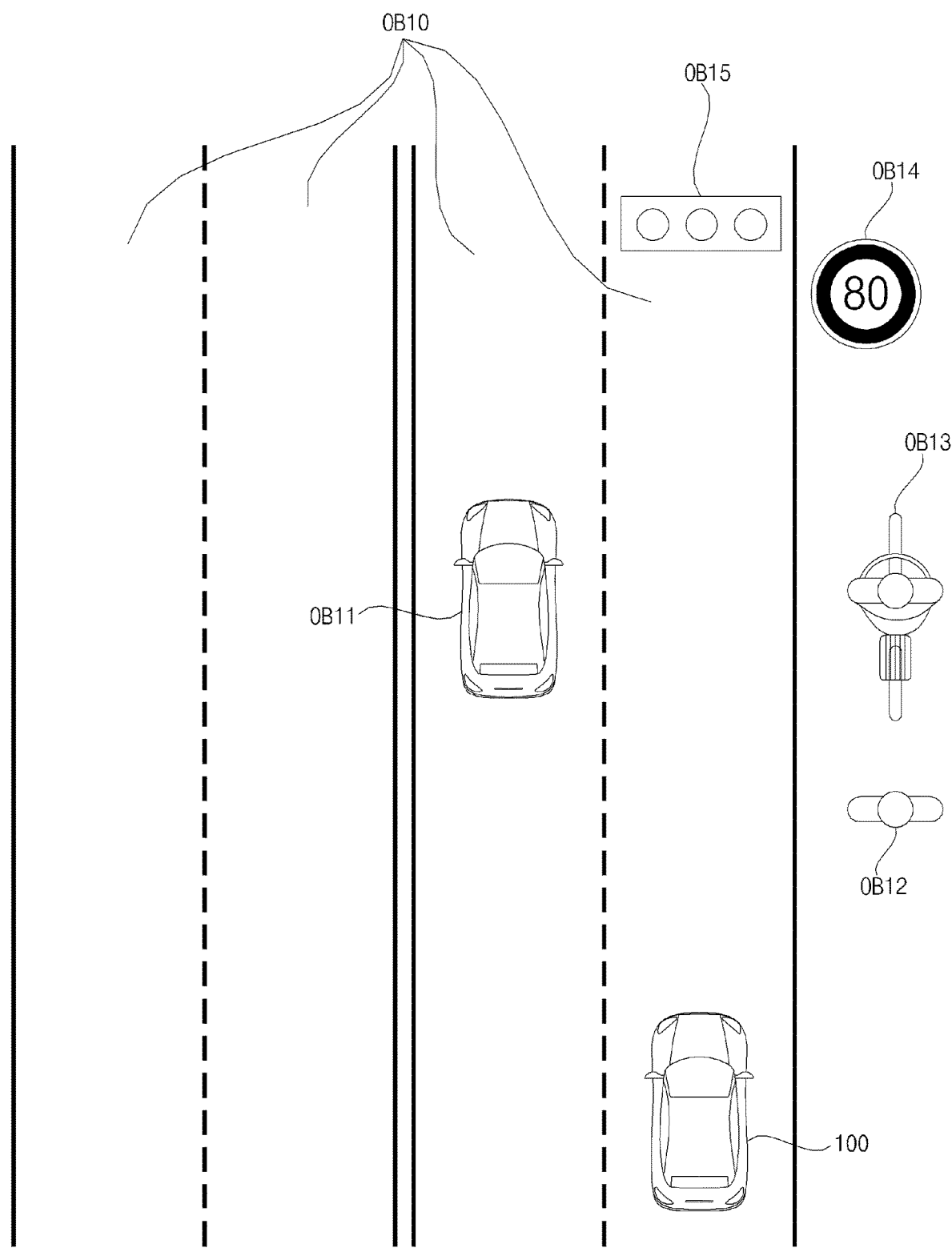
FIG. 5 and FIG. 6 are reference diagrams illustrating an object according to an embodiment of the present invention.
Figure 6:
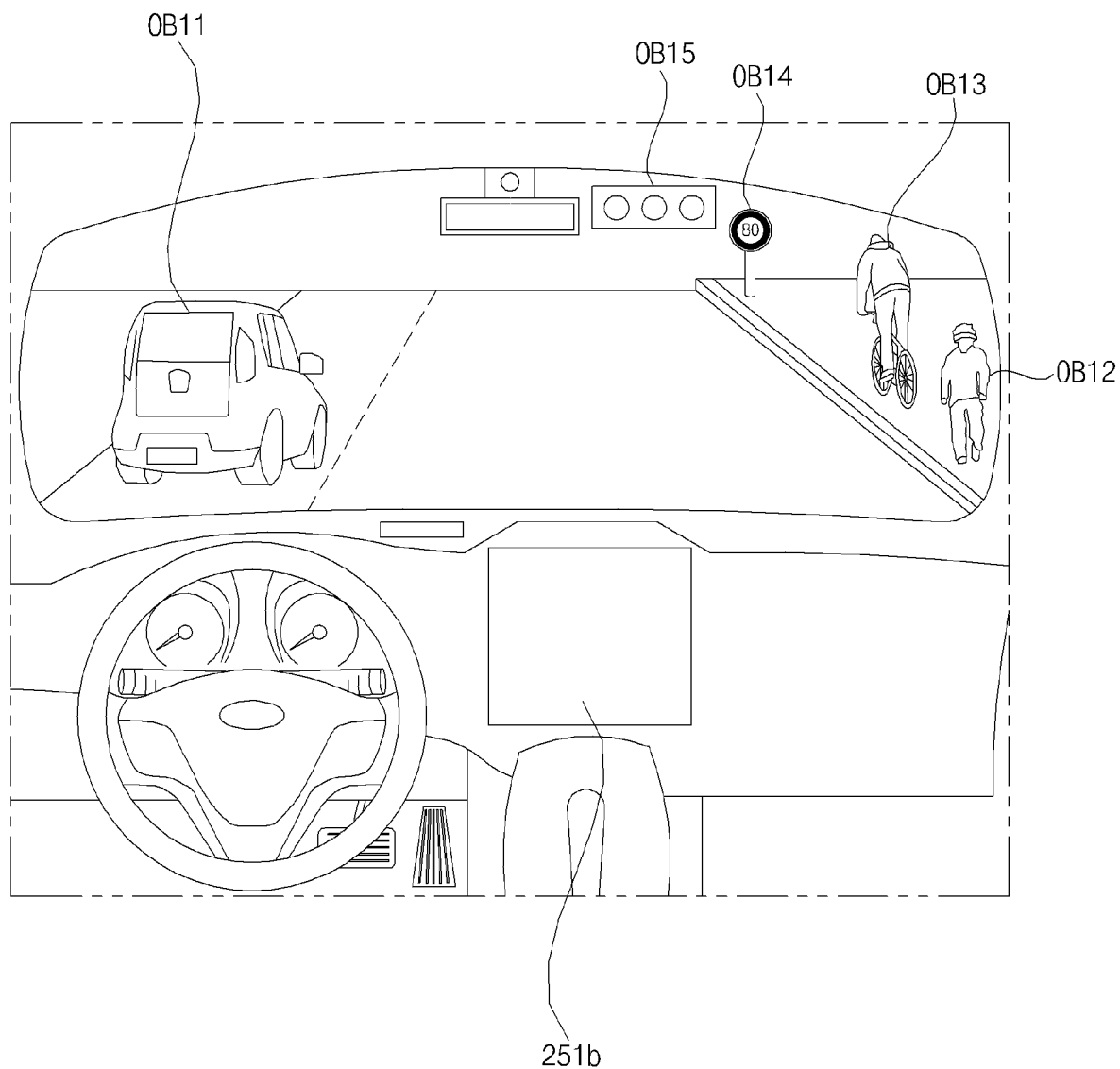

FIG. 5 and FIG. 6 are reference diagrams illustrating an object according to an embodiment of the present invention.

Figure 7:
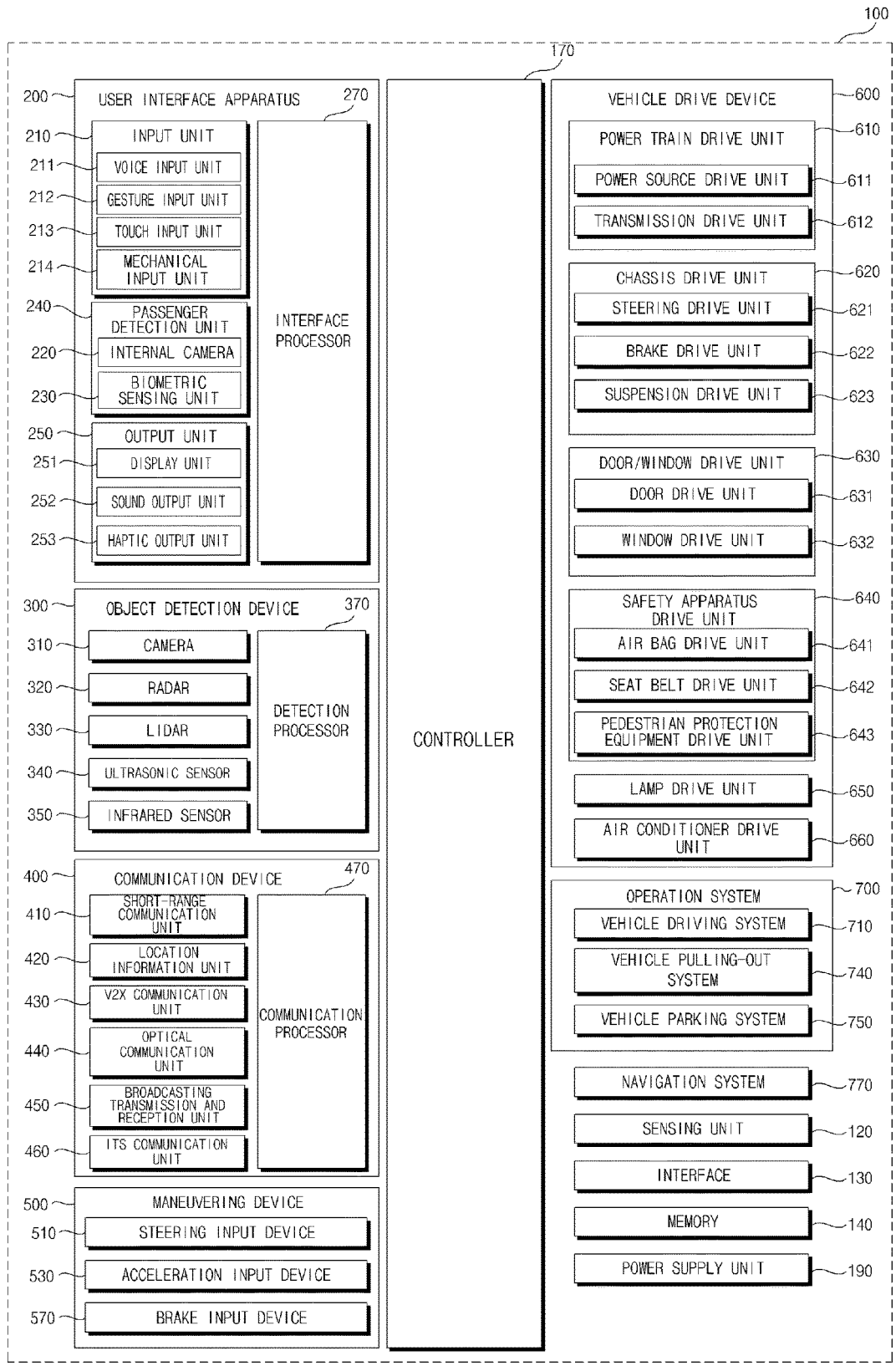
FIG. 7 is a block diagram illustrating a vehicle according to an embodiment of the present invention.

FIG. 7 is a block diagram illustrating a vehicle according to an embodiment of the present invention.

Referring to FIGS. 1 to 7, a vehicle 100 may include a wheel rotated by a power source, and a steering input unit 510 for adjusting the traveling direction of the vehicle 100.

The vehicle 100 may include various driver assistance devices. The driver assistance device is a device that assists a driver, based on information acquired from various sensors. Such a driver assistive device may be referred to as advanced driver assistance system (ADAS).

The vehicle 100 may include various vehicle lighting devices. The vehicle lighting devices may include a head lamp, a rear combination lamp, a turn traffic light, a room lamp, and the like. The rear combination lamp includes a brake lamp and a tail lamp.

The vehicle 100 may include a sensing device provided therein and a sensing device provided externally.

An overall length means a length from a front portion to a rear portion of the vehicle 100, a width means a breadth of the vehicle 100, and a height means a length from the bottom of the wheel to a roof thereof. In the following description, it is assumed that an overall length direction L is a reference direction in which the overall length of the vehicle 100 is measured, a width direction W is a reference direction in which the width of the vehicle 100 is measured, and a height direction H is a reference direction in which the height of the vehicle 100 is measured.

The vehicle 100 may be an autonomous vehicle. The vehicle 100 may autonomously travel under the control of a controller 170. The vehicle 100 may perform autonomous traveling, based on vehicle traveling information.

The vehicle traveling information is information acquired or provided through various units provided in the vehicle 100. The vehicle traveling information may be information that the controller 170 or a driving system 700 utilizes to control the vehicle 100.

The vehicle traveling information may be classified into around situation information related to the around situation of the vehicle 100, vehicle state information related to the state of various devices provided in the vehicle 100, passenger information related to the passenger of the vehicle 100, and the like depending on what the information relates to. Accordingly, the vehicle traveling information may include at least one of the around situation information, the vehicle state information, and the passenger information.

The vehicle traveling information may be classified into object information acquired by an object detection unit 300, communication information that a communication unit 400 receives from an external communication apparatus, a user input that the user interface unit 200 or a driving operation unit 500 receive, navigation information provided by a navigation system 770, various sensing information provided by the sensing unit 120, and storage information stored in a memory 140. Accordingly, the vehicle traveling information may include at least one of the object information, the communication information, the user input, the navigation information, the sensing information, information acquired and provided by the interface unit 130, and the storage information.

The vehicle traveling information may be acquired through at least one of the user interface unit 200, the object detection unit 300, the communication unit 400, the driving operation unit 500, the navigation system 770, the sensing unit 120, the interface unit 130, and the memory 140, and provided to the controller 170 or the driving system 700. The controller 170 or the driving system 700 may control the vehicle 100 to autonomously travel based on the vehicle traveling information.

The object information is information about an object detected by the object detection unit 300. For example, the object information may be information about a shape, position, size, color, and the like of the object. For example, the object information may be information about a lane, an image displayed on a road surface, an obstacle, other vehicle, a pedestrian, a traffic light, various structures, a traffic sign, and the like.

The communication information may be information transmitted by an external device capable of communicating. For example, the communication information may include at least one of information transmitted by other vehicle, information transmitted by a mobile terminal, information transmitted by a traffic infrastructure, and information generated in a specific network. The traffic infrastructure may include a traffic light, and the traffic light may transmit information on a traffic signal.

The vehicle traveling information may include at least one of information on the state of various devices provided in the vehicle 100 and information on the position of the vehicle 100. For example, the vehicle traveling information may include information on errors of various apparatuses provided in the vehicle 100, information on the operating states of various apparatuses provided in the vehicle 100, information on the traveling lane of the vehicle 100, map information, and the like.

For example, the controller 170 and the driving system 700 may determine the type, position, and movement of an object existing around the vehicle 100, based on the vehicle traveling information. The controller 170 or the driving system 700 may determine the possibility of collision between the vehicle and the object, the type of the road on which the vehicle 100 travels, a traffic signal around the vehicle 100, the movement of the vehicle 100, and the like, based on the vehicle traveling information.

Among the vehicle traveling information, information about the surrounding environment or situation of the vehicle may be referred to as surrounding environment information or around situation information. For example, among the communication information that the communication unit 400 receives from an external communication apparatus, information about the traveling zone on which the vehicle 100 travels, the traffic situation, and other vehicle is information corresponding to the around situation information. For example, among the navigation information provided by the navigation system 770, the map information or the position information of the vehicle 100 is information corresponding to the around situation information.

The passenger information is information on the passenger of the vehicle 100. Among the vehicle traveling information, information related to the passenger of the vehicle 100 may be referred to as passenger information.

The passenger information may be acquired through an internal camera 220 or a biometric sensor unit 230. In this instance, the passenger information may include at least one of a photographed image of the passenger of the vehicle 100 and the biometric information of the passenger.

For example, the passenger information may be the image of the passenger acquired through the internal camera 220. For example, the biometric information may be information about body temperature, pulse, brain waves, and the like of the passenger acquired through the biometric sensor unit 230.

For example, the controller 170 may determine the passenger's position, shape, gaze, face, behavior, facial expression, drowsiness, health state, and emotional state, based on the passenger information.

The passenger information may be information transmitted by the passenger's mobile terminal and received by the communication unit 400. For example, the passenger information may be authentication information for authenticating the passenger.

The passenger information may be acquired through a passenger detection unit 240 or the communication unit 400 and may be provided to the controller 170. The passenger information may be included in the vehicle traveling information.

Vehicle state information is information related to the state of various units provided in the vehicle 100. Among the vehicle traveling information, information related to the state of the units of the vehicle 100 may be referred to as vehicle state information.

For example, the vehicle state information may include information on an operation state and an error of the user interface unit 200, the object detection unit 300, the communication unit 400, the driving operation unit 500, the vehicle driving unit 600, the driving system 700, the navigation system 770, the sensing unit 120, the interface unit 130, and the memory 140.

The controller 170 may determine an operation or an error of various units provided in the vehicle 100, based on the vehicle state information. For example, the controller 170 may determine whether a GPS signal of the vehicle 100 is normally received, an error occurs in at least one of the sensors provided in the vehicle 100, or each of the units provided in the vehicle 100 operates normally.

The vehicle state information may be included in the vehicle traveling information.

A control mode of the vehicle 100 may be a mode that indicates a subject that controls the vehicle 100.

For example, the control mode of the vehicle 100 may include an autonomous mode in which the controller 170 or the driving system 700 included in the vehicle 100 controls the vehicle 100, a manual mode in which the vehicle 100 is controlled by a driver who rides in the vehicle 100, and a remote control mode in which a device excluding the vehicle 100 controls the vehicle 100.

When the vehicle 100 is in the autonomous mode, the controller 170 or the driving system 700 may control the vehicle 100, based on the vehicle traveling information. Thus, the vehicle 100 may be operated without a user command through the driving operation unit 500. For example, the vehicle 100 in the autonomous mode may be operated based on information, data, or a signal generated in a traveling system 710, a parking out system 740, and a parking system 750.

When the vehicle 100 is in the manual mode, the vehicle 100 may be controlled according to a user command for at least one of steering, acceleration, and deceleration received through the driving operation unit 500. In this instance, the driving operation unit 500 may generate an input signal corresponding to the user command and provide the input signal to the controller 170. The controller 170 may control the vehicle 100, based on the input signal provided by the driving operation unit 500.

When the vehicle 100 is in the remote control mode, a device other than the vehicle 100 may control the vehicle 100. When the vehicle 100 is operated in the remote control mode, the vehicle 100 may receive a remote control signal transmitted by the other device through the communication unit 400. The vehicle 100 may be controlled based on the remote control signal.

The vehicle 100 may enter one of the autonomous mode, the manual mode, and the remote control mode, based on the user input received through the user interface unit 200.

The control mode of the vehicle 100 may be switched to one of the autonomous mode, the manual mode, and the remote control mode, based on the vehicle traveling information. For example, the control mode of the vehicle 100 may be switched from the manual mode to the autonomous mode or may be switched from the autonomous mode to the manual mode, based on the object information generated by the object detection unit 300. The control mode of the vehicle 100 may be switched from the manual mode to the autonomous mode or switched from the autonomous mode to the manual mode, based on the information received via the communication unit 400.

As illustrated in FIG. 7, the vehicle 100 may include the user interface unit 200, the object detection unit 300, the communication unit 400, the driving operation unit 500, the vehicle driving unit 600, the driving system 700, the navigation system 770, the sensing unit 120, the interface unit 130, the memory 140, the controller 170, and a power supply unit 190. According to an embodiment, the vehicle 100 may further include other components in addition to the components described herein, or may not include some of the components described.

The user interface unit 200 is a unit for communicating between the vehicle 100 and a user. The user interface unit 200 may receive a user input and provide the user with information generated in the vehicle 100. The vehicle 100 may implement user interfaces (UI) or user experience (UX) through the user interface unit 200.

The user interface unit 200 may include an input unit 210, the internal camera 220, the biometric sensor unit 230, an output unit 250, and an interface processor 270.

According to an embodiment, the user interface unit 200 may further include other components in addition to the components described herein, or may not include some of the components described.

The input unit 210 is an element for receiving a user command from a user. The data collected by the input unit 210 may be analyzed by the interface processor 270 and recognized as a user's control command.

The input unit 210 may be disposed inside the vehicle. For example, the input unit 210 may include a certain area of a steering wheel, a certain area of an instrument panel, a certain area of a seat, a certain area of each pillar, a certain area of a door, a certain area of a center console, a certain area of a head lining, a certain area of a sun visor, a certain area of a windshield, a certain area of a window, or the like.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the interface processor 270 or the controller 170.

The voice input unit 211 may include one or more microphones.

The gesture input unit 212 may convert user's gesture input to an electrical signal. The converted electrical signal may be provided to the interface processor 270 or the controller 170.

The gesture input unit 212 may include at least one of an infrared sensor and an image sensor for sensing user's gesture input.

According to an embodiment, the gesture input 212 may sense user's three-dimensional gesture input. Thus, the gesture input unit 212 may include a light output unit for outputting a plurality of infrared rays or a plurality of image sensors.

The gesture input unit 212 may sense user's three-dimensional gesture input through a time of flight (TOF) method, a structured light method, or a disparity method.

The touch input unit 213 may convert the touch input of a user into an electrical signal. The converted electrical signal may be provided to the interface processor 270 or the controller 170.

The touch input unit 213 may include a touch sensor for sensing the touch input of a user.

According to an embodiment, the touch input unit 213 may be integrated with a display unit 251 to implement a touch screen. Such a touch screen may provide an input interface between the vehicle 100 and a user and an output interface simultaneously.

The mechanical input unit 214 may include at least one of a button, a dome switch, a jog wheel, and a jog switch. The electrical signal generated by the mechanical input 214 may be provided to the interface processor 270 or the controller 170.

The mechanical input unit 214 may be disposed in a steering wheel, a center fascia, a center console, a cockpit module, a door, or the like.

The passenger detection unit 240 may detect a passenger inside the vehicle 100. The passenger detection unit 240 may include the internal camera 220 and the biometric sensor unit 230.

The internal camera 220 may acquire an in-vehicle image. The interface processor 270 may detect the state of a user, based on the in-vehicle image. For example, the detected state of the user may be the user's gaze, face, behavior, facial expression, and position.

The interface processor 270 may determine the user's gaze, face, behavior, facial expression, and position based on the in-vehicle image acquired by the internal camera 220. The interface processor 270 may determine the user's gesture based on the in-vehicle image. The result that the interface processor 270 determines based on the in-vehicle image may be referred to as passenger information. In this instance, the passenger information may be information indicating the direction of the user's gaze, behavior, facial expression, gesture, and the like. The interface processor 270 may provide the passenger information to the controller 170.

The biometric sensor unit 230 may acquire biometric information of a user. The biometric sensor unit 230 may include a sensor capable of acquiring the biometric information of the user, and may acquire fingerprint information, heartbeat information, brainwave information, and the like of the user using the sensor. The biometric information may be used for user authentication or for state determination of user.

The interface processor 270 may determine the state of the user, based on the biometric information of the user acquired by the biometric sensor unit 230. The state of the user determined by the interface processor 270 may be referred to as passenger information. In this instance, the passenger information is information indicating whether the user is stunned, sleepy, excited, or in an emergency. The interface processor 270 may provide the passenger information to the controller 170.

The output unit 250 is an element for generating an output related to vision, auditory, tactile sense, or the like.

The output unit 250 may include at least one of a display unit 251, a sound output unit 252, and a haptic output unit 253.

The display unit 251 may display graphic objects corresponding to various information.

The display unit 251 may include at least one of a liquid crystal display (LCD), a thin film transistor-liquid crystal display (TFT LCD), an organic light-emitting diode (OLED), a flexible display, a 3D display, and an e-ink display.

The display unit 251 may achieve a mutual layer structure with the touch input unit 213 or may be integrally formed to implement a touch screen.

The display unit 251 may be implemented as a Head Up Display (HUD). When the display unit 251 is implemented as an HUD, the display unit 251 may include a projection module to output information through an image projected on a windshield or a window.

The display unit 251 may include a transparent display. The transparent display may be attached to a windshield or window.

The transparent display may display a certain screen while having a certain transparency. In order to have transparency, the transparent display may include at least one of a transparent thin film electroluminescent (TFEL), a transparent organic light-emitting diode (OLED), a transparent liquid crystal display (LCD), a transmissive transparent display, and a transparent light emitting diode (LED) display. The transparency of the transparent display may be adjusted.

In addition, the user interface unit 200 may include a plurality of display units 251a to 251g.

The display unit 251 may be disposed in a certain area of the steering wheel, a certain area 251a, 251b, and 251e of the instrument panel, a certain area 251d of the seat, a certain area 251f of each pillar, a certain area 251g of the door, a certain area of the center console, a certain area of the head lining, and a certain area of the sun visor, or may be implemented in a certain area 251c of the windshield, and a certain area 251h of the window.

The sound output unit 252 may convert an electric signal provided from the interface processor 270 or the controller 170 into an audio signal and output the audio signal. Thus, the sound output unit 252 may include one or more speakers.

The haptic output unit 253 may generate a tactile output. For example, the tactile output is a vibration. The haptic output unit 253 may operate to vibrate the steering wheel, a safety belt, the seat 110FL, 110FR, 110RL, and 110RR so that a user can recognize an output.

The interface processor 270 may control the overall operation of each unit of the user interface unit 200.

According to an embodiment, the user interface unit 200 may include a plurality of interface processors 270, or may not include the interface processor 270.

When the user interface unit 200 does not include the interface processor 270, the user interface unit 200 may be operated under the control of a processor of other unit in the vehicle 100 or the controller 170.

In addition, the user interface unit 200 may be referred to as a vehicle display unit.

The user interface unit 200 may be operated under the control of the controller 170.

The object detection unit 300 is an apparatus for sensing an object positioned outside the vehicle 100.

The object may be various objects related to the driving of the vehicle 100.

Referring to FIG. 5 to FIG. 6, an object O may include a lane OB10, a line to distinguish the lane OB10, other vehicle OB11, a pedestrian OB12, a two-wheeler OB13, a traffic signal OB14 and OB15, a curb to distinguish sidewalk, a light, a road, a structure, a speed bump, a terrain, an animal, and the like.

The lane OB10 may be a traveling lane, a side lane of the traveling lane, and a lane on which an opposed vehicle travels. The lane OB10 may include left and right lines forming a lane.

The other vehicle OB11 may be a vehicle traveling around the vehicle 100. The other vehicle may be a vehicle positioned within a certain distance from the vehicle 100. For example, the other vehicle OB11 may be a vehicle preceding or following the vehicle 100. For example, the other vehicle OB11 may be a vehicle traveling in the side of the vehicle 100.

The pedestrian OB12 may be a person positioned around the vehicle 100. The pedestrian OB12 may be a person positioned within a certain distance from the vehicle 100. For example, the pedestrian OB12 may be a person positioned on a sidewalk or a driveway.

The two-wheeler OB13 may mean a conveyance positioned around the vehicle 100 and moves using two wheels. The two-wheeler OB13 may be a conveyance having two wheels positioned within a certain distance from the vehicle 100. For example, the two-wheeler OB13 may be a motorcycle or a bicycle positioned on a sidewalk or a driveway.

The traffic signal may include a traffic light (OB15), a traffic sign (OB14), and a pattern or text drawn on a road surface.

The light may be light generated from a lamp provided in other vehicle. The light may be a light generated from a street light. The light may be a solar light. The road may include a road surface, a curve, a slope such as an ascent, a descent, and the like. The terrain may include mountains, hills, and the like. The structure may be an object positioned around the road and fixed to the ground. For example, the structure may include a street light, a street tree, a building, a telephone pole, a traffic light, a bridge, a curb, and a guard rail.

In addition, an object may be classified into a moving object and a fixed object. The moving object is a movable object. For example, the moving object may include other vehicle and pedestrian. The fixed object is an object that cannot be moved. For example, the fixed object may include a traffic signal, a road, a structure, and a lane.

The object detection unit 300 may detect obstacles existing outside the vehicle 100. The obstacle may be one of a thing, a pit formed on the road, an uphill starting point, a downhill starting point, an inspection pit, a speed limit stop, and a threshold stop. The thing may be an object having a volume and a mass.

The object detection unit 300 may include a camera 310, a radar 320, a lidar 330, an ultrasonic sensor 340, an infrared sensor 350, and a detection processor 370.

According to an embodiment, the object detection unit 300 may further include other components in addition to the described components, or may not include some of the described components.

The camera 310 may be positioned in an appropriate position outside the vehicle to acquire an external image of the vehicle. The camera 310 may provide the acquired image to the detection processor 370. The camera 310 may be a mono camera, a stereo camera 310a, an around view monitoring (AVM) camera 310b, or a 360 degree camera.

For example, the camera 310 may be disposed, in the interior of the vehicle, close to a front windshield, to acquire an image ahead of the vehicle. Alternatively, the camera 310 may be disposed around a front bumper or radiator grille.

For example, the camera 310 may be disposed, in the interior of the vehicle, close to a rear glass, to acquire an image behind the vehicle. Alternatively, the camera 310 may be disposed around a rear bumper, a trunk, or a tailgate.

For example, the camera 310 may be disposed, in the interior of the vehicle, close to at least one of the side windows to acquire an image of the side of the vehicle. Alternatively, the camera 310 may be disposed around a side mirror, a fender, or a door.

The radio detection and ranging (radar) 320 may include an electromagnetic wave transmitting unit and an electromagnetic wave receiving unit. The radar 320 may be implemented by a pulse radar method or a continuous wave radar method in terms of the radio wave emission principle. The radar 320 may be implemented by a frequency modulated continuous wave (FMCW) method or a frequency shift keying (FSK) method according to a signal waveform among a continuous wave radar method.

The radar 320 may detect an object based on a time-of-flight (TOF) method or a phase-shift method through an electromagnetic wave, and detect the position of the detected object, the distance to the detected object, and the relative speed with the detected object.

The radar 320 may be disposed in an appropriate position outside the vehicle to sense an object positioned at the front, rear, or side of the vehicle.

The light detection and ranging (lidar) 330 may include a laser transmitting unit and a laser receiving unit. The lidar 330 may be implemented in the time-of-flight (TOF) method or the phase-shift method. The lidar 330 may be implemented in a driving type or a non-driving type.

When implemented in the driving type, the lidar 330 may be rotated by a motor and may detect an object around the vehicle 100.

When implemented in the non-driving type, the lidar 330 may detect an object positioned within a certain range based on the vehicle 100 by optical steering. The vehicle 100 may include a plurality of non-driving type lidars 330.

The lidar 330 may detect an object based on the time-of-flight (TOF) method or the phase-shift method, through a laser light, and detect the position of the detected object, the distance to the detected object, and the relative speed with the detected object.

The lidar 330 may be disposed in an appropriate position outside the vehicle to detect an object positioned at the front, rear, or side of the vehicle.

The ultrasonic sensor 340 may include an ultrasonic transmitting unit and an ultrasonic receiving unit. The ultrasonic sensor 340 may detect the object based on an ultrasonic wave, and may detect the position of the detected object, the distance to the detected object, and the relative speed with the detected object.

The ultrasonic sensor 340 may be disposed in an appropriate position outside the vehicle to detect an object positioned at the front, rear, or side of the vehicle.

The infrared sensor 350 may include an infrared ray transmitting unit and an infrared ray receiving unit. The infrared sensor 350 may detect the object based on an infrared ray, and may detect the position of the detected object, the distance to the detected object, and the relative speed with the detected object.

The infrared sensor 350 may be disposed in an appropriate position outside the vehicle to detect an object positioned at the front, rear, or side of the vehicle.

The detection processor 370 may control the overall operation of each unit of the object detection unit 300.

The detection processor 370 may detect and track the object based on the acquired image. The detection processor 370 may perform operations such as calculating a distance to object, calculating a relative speed with object, determining a type, a position, a size, a shape, a color, a movement path of object, determining a sensed content of text, and the like through an image processing algorithm.

The detection processor 370 may detect and track an object, based on a reflected electromagnetic wave which is a transmitted electromagnetic wave that is reflected by the object and returned. The detection processor 370 may perform operations such as calculating a distance to the object and calculating a relative speed with the object, based on the electromagnetic wave.

The detection processor 370 may detect and track an object, based on a reflected laser light which is a transmitted electromagnetic laser that is reflected by the object and returned. The detection processor 370 may perform operations such as calculating a distance to the object and calculating a relative speed with the object, based on the laser light.

The detection processor 370 may detect and track an object, based on a reflected ultrasonic wave which is a transmitted ultrasonic wave that is reflected by the object and returned. The detection processor 370 may perform operations such as calculating a distance to the object and calculating a relative speed with the object based on the ultrasonic wave.

The detection processor 370 may detect and track an object based on a reflected infrared light which is a transmitted infrared light that is reflected by the object and returned. The detection processor 370 may perform operations such as calculating a distance to the object and calculating a relative speed with the object based on the infrared light.

The detection processor 370 may generate object information, based on at least one of the image acquired through the camera 310, the reflected electromagnetic wave received through the radar 320, the reflected laser light received through the lidar 330, the reflected ultrasonic wave received through the ultrasonic sensor 340, and the reflected infrared light received through the infrared sensor 350.

The object information may be information about the type, position, size, shape, color, movement path, speed, and sensed content of the text, and the like of the object existing around the vehicle 100.

For example, the object information may indicate whether a lane exists around the vehicle 100, whether other vehicle around the vehicle 100 is traveling while the vehicle 100 is stopped, whether a stopping zone exists around the vehicle 100, the possibility of collision between the vehicle and the object, how a pedestrian and a bicycle are distributed around the vehicle 100, the type of road on which the vehicle 100 travels, the state of the traffic light around the vehicle 100, the motion of the vehicle 100, and the like. The object information may be included in the vehicle traveling information.

The detection processor 370 may provide the generated object information to the controller 170.

According to an embodiment, the object detection unit 300 may include a plurality of processors 370 or may not include the detection processor 370. For example, each of the camera 310, the radar 320, the lidar 330, the ultrasonic sensor 340, and the infrared sensor 350 may individually include a processor.

The object detection unit 300 may be operated under the control of a processor of a unit in the vehicle 100 or the controller 170.

The communication unit 400 is a unit for performing communication with an external device. Here, the external device may be one of other vehicle, a mobile terminal, a wearable device, and a server.

The communication unit 400 may include at least one of a transmission antenna, a reception antenna, a radio frequency (RF) circuit capable of implementing various communication protocols, and a RF device, to accomplish communication.

The communication unit 400 may include a short-range communication unit 410, a position information unit 420, a V2X communication unit 430, an optical communication unit 440, a broadcast transmission/reception unit 450, an intelligent transport systems (ITS) communication unit 460, and a communication processor 470.

According to an embodiment, the communication unit 400 may further include other components in addition to the described components, or may not include some of the described components.

The short-range communication unit 410 is a unit for short-range communication. The short-range communication unit 410 may support a short-range communication by using at least one of Bluetooth™, Radio Frequency Identification (RFID), Infrared Data Association (IrDA), Ultra-Wideband (UWB), ZigBee, Near Field Communication (NFC) Wireless-Fidelity (Wi-Fi), Wi-Fi Direct, and Wireless Universal Serial Bus (Wireless USB) technologies.

The short-range communication unit 410 may form short-range wireless area networks to perform short-range communication between the vehicle 100 and at least one external device.

The position information unit 420 is a unit for acquiring position information of the vehicle 100. For example, the position information unit 420 may include at least one of a Global Positioning System (GPS) module, a Differential Global Positioning System (DGPS) module, and a Carrier phase Differential GPS (CDGPS) module.

The position information unit 420 may acquire GPS information through the GPS module. The position information unit 420 may transmit the acquired GPS information to the controller 170 or the communication processor 470. The GPS information acquired by the position information unit 420 may be utilized at the time of autonomous traveling of the vehicle 100. For example, the controller 170 may control the vehicle 100 to autonomously travel based on the GPS information and the navigation information acquired through the navigation system 770.

The V2X communication unit 430 is a unit for performing wireless communication with a server (V2I: Vehicle to Infra), other vehicle (V2V: Vehicle to Vehicle), or a pedestrian (V2P: Vehicle to Pedestrian). The V2X communication unit 430 may include an RF circuit capable of implementing protocols for communication with infra (V2I), inter-vehicle communication (V2V), and communication with pedestrian (V2P).

The optical communication unit 440 is a unit for performing communication with an external device through light. The optical communication unit 440 may include a light transmitting unit that converts an electric signal into an optical signal and transmits the optical signal to the outside, and a light receiving unit that converts a received optical signal into an electric signal.

According to an embodiment, the light transmitting unit may be formed to be integrated with a lamp included in the vehicle 100.

The broadcast transmission/reception unit 450 is a unit for receiving a broadcast signal from an external broadcast management server through a broadcast channel or transmitting a broadcast signal to a broadcast management server. The broadcast channel may include a satellite channel and a terrestrial channel. The broadcast signal may include a TV broadcast signal, a radio broadcast signal, and a data broadcast signal.

The ITS communication unit 460 may communicates with a server that provides an intelligent traffic system. The ITS communication unit 460 may receive information about various traffic situations from a server of the intelligent traffic system. The information about traffic situations may include information about traffic congestion, traffic situations by road, traffic volume by section, and the like.

The communication processor 470 may control the overall operation of each unit of the communication unit 400.

The vehicle traveling information may include information received via at least one of the short-range communication unit 410, the position information unit 420, the V2X communication unit 430, the optical communication unit 440, the broadcast transmission/reception unit 450, and the ITS communication unit 460.

For example, the vehicle traveling information may include information about the position, type, driving lane, speed, various sensing values, and the like of the other vehicle received from the other vehicle. When information about various sensing values of other vehicle is received through the communication unit 400, the controller 170 may acquire information about various objects existing around the vehicle 100 even if there is no separate sensor in the vehicle 100.

For example, the vehicle traveling information may indicate the type, position, and movement of an object existing around the vehicle 100, whether a lane exists around the vehicle 100, whether other vehicle around the vehicle 100 is traveling while the vehicle 100 is stopped, whether a stopping zone exists around the vehicle 100, the possibility of collision between the vehicle and the object, how a pedestrian and a bicycle are distributed around the vehicle 100, the type of road on which the vehicle 100 travels, the state of the traffic light around the vehicle 100, the motion of the vehicle 100, and the like.

According to an embodiment, the communication unit 400 may include a plurality of processors 470 or may not include communication processor 470.

When the processor 400 is not included in the communication unit 400, the communication unit 400 may be operated under the control of a processor of other unit in the vehicle 100 or the controller 170.

In addition, the communication unit 400 may implement a vehicle display apparatus together with the user interface unit 200. In this instance, the vehicle display apparatus may be referred to as a telematics apparatus or an audio video navigation (AVN) apparatus.

The communication unit 400 may be operated under the control of the controller 170.

The driving operation unit 500 is a unit for receiving a user command for driving.

In a manual mode, the vehicle 100 may be driven based on a signal provided by the driving operation unit 500.

The driving operation unit 500 may include a steering input unit 510, an acceleration input unit 530, and a brake input unit 570.

The user command for steering may be a command corresponding to a specific steering angle. For example, the user command for steering may correspond to 45 degrees to the right.

The steering input unit 510 may be formed in a wheel shape to enable steering input by rotation. In this instance, the steering input unit 510 may be referred to as a steering wheel or a handle.

The steering input unit 510 may receive a user command for the steering of the vehicle 100 from a user.

According to an embodiment, the steering input unit may be formed as a touch screen, a touch pad, or a button.

The acceleration input unit 530 may receive a user command for acceleration of the vehicle 100 from the user.

The brake input unit 570 may receive a user command for deceleration of the vehicle 100 from the user. The acceleration input unit 530 and the brake input unit 570 may be formed in a pedal shape.

According to an embodiment, the acceleration input unit or the brake input unit may be formed as a touch screen, a touch pad, or a button.

The driving operation unit 500 may be operated under the control of the controller 170.

The vehicle driving unit 600 is an apparatus for electrically controlling the driving of various units in the vehicle 100.

The vehicle driving unit 600 may include a power train driving unit 610, a chassis driving unit 620, a door/window driving unit 630, a safety apparatus driving unit 640, a lamp driving unit 650, and an air conditioning driving unit 660.

According to an embodiment, the vehicle driving unit 600 may further include other components in addition to the described components, or may not include some of the described components.

In addition, the vehicle driving unit 600 may include a processor. Each unit of the vehicle driving unit 600 may individually include a processor.

The power train driving unit 610 may control the operation of a power train apparatus.

The power train driving unit 610 may include a power source driving unit 611 and a transmission driving unit 612.

The power source driving unit 611 may perform a control of a power source of the vehicle 100.

For example, when a fossil fuel-based engine is a power source, the power source driving unit 611 may perform electronic control of the engine. Thus, the output torque of the engine and the like may be controlled. The power source driving unit 611 may adjust the engine output torque under the control of the controller 170.

For example, when an electric energy based motor is a power source, the power source driving unit 611 may perform control of the motor. The power source driving unit 611 may adjust the rotation speed, the torque, and the like of the motor under the control of the controller 170.

The transmission driving unit 612 may perform control of a transmission.

The transmission driving unit 612 may adjust the state of the transmission. The transmission driving unit 612 may adjust the state of the transmission to driving (D), reverse (R), neutral (N), or parking (P).

In addition, when the engine is a power source, the transmission driving unit 612 may adjust a gear engagement state in the driving (D) state.

The chassis driving unit 620 may control the operation of an chassis apparatus.

The chassis driving unit 620 may include a steering driving unit 621, a brake driving unit 622, and a suspension driving unit 623.

The steering driving unit 621 may perform electronic control of a steering apparatus in the vehicle 100. The steering driving unit 621 may change the traveling direction of the vehicle.

The brake driving unit 622 may perform electronic control of a brake apparatus in the vehicle 100. For example, it is possible to reduce the speed of the vehicle 100 by controlling the operation of a brake disposed in a wheel.

In addition, the brake driving unit 622 may individually control each of a plurality of brakes. The brake driving unit 622 may control the braking forces applied to the plurality of wheels to be different from each other.

The suspension driving unit 623 may perform electronic control of a suspension apparatus in the vehicle 100. For example, when there is a curvature on the road surface, the suspension driving unit 623 may control the suspension apparatus to reduce the vibration of the vehicle 100.

In addition, the suspension driving unit 623 may individually control each of the plurality of suspensions.

The door/window driving unit 630 may perform electronic control of a door apparatus or a window apparatus in the vehicle 100.

The door/window driving unit 630 may include a door driving unit 631 and a window driving unit 632.

The door driving unit 631 may control the door apparatus. The door driving unit 631 may control the opening and closing of a plurality of doors included in the vehicle 100. The door driving unit 631 may control the opening or closing of a trunk or a tail gate. The door driving unit 631 may control the opening or closing of a sunroof.

The window driving unit 632 may perform electronic control of the window apparatus. It is possible to control the opening or closing of a plurality of windows included in the vehicle 100.

The safety apparatus driving unit 640 may perform electronic control of various safety apparatuses in the vehicle 100.

The safety apparatus driving unit 640 may include an airbag driving unit 641, a seatbelt driving unit 642, and a pedestrian protection apparatus driving unit 643.

The airbag driving unit 641 may perform electronic control of an airbag apparatus in the vehicle 100. For example, the airbag driving unit 641 may control an airbag to be unfolded when a danger is detected.

The seatbelt driving unit 642 may perform electronic control of a seatbelt apparatus in the vehicle 100. For example, the seatbelt driving unit 642 may control a passenger to be fixed to the seats 110FL, 110FR, 110RL, and 110RR using a seatbelt when a danger is detected.

The pedestrian protection apparatus driving unit 643 may perform electronic control of a hood lift and a pedestrian airbag. For example, the pedestrian protection apparatus driving unit 643 may control the hood lift-up and the pedestrian airbag unfoldment when a collision with a pedestrian is detected.

The lamp driving unit 650 may perform electronic control of various lamp apparatuses in the vehicle 100.

The air conditioning driving unit 660 may perform electronic control of an air conditioner in the vehicle 100. For example, when the temperature inside the vehicle is high, the air conditioning driving unit 660 may control the air conditioner to operate so that cool air is supplied to the inside of the vehicle.

The vehicle driving unit 600 may include a processor. Each unit of the vehicle driving unit 600 may individually include a processor.

The vehicle driving unit 600 may be operated under the control of the controller 170.

The driving system 700 is a system for controlling various driving of the vehicle 100. The driving system 700 may be operated in the autonomous mode. The driving system 700 may perform the autonomous traveling of the vehicle 100, based on the position information and the navigation information of the vehicle 100. The driving system 700 may include the traveling system 710, the parking out system 740, and the parking system 750.

According to an embodiment, the driving system 700 may further include other components in addition to the described components, or may not include some of the described components.

In addition, the driving system 700 may include a processor. Each unit of the driving system 700 may individually include a processor.

In addition, according to an embodiment, when the driving system 700 is implemented in software, it may be a sub-concept of the controller 170.

In addition, according to an embodiment, the driving system 700 may include at least one of the user interface unit 200, the object detection unit 300, the communication unit 400, the vehicle driving unit 600, and the controller 170.

The traveling system 710 may control the vehicle 100 to accomplish the autonomous traveling.

The traveling system 710 may provide a control signal to the vehicle driving unit 600 to perform the traveling of the vehicle 100, based on the vehicle traveling information. The vehicle driving system 600 may operate based on the control signal provided by the traveling system 710. Thus, the vehicle may perform the autonomous traveling.

For example, the traveling system 710 may provide a control signal to the vehicle driving unit 600 to perform the traveling of the vehicle 100, based on the object information provided by the object detection unit 300.

For example, the traveling system 710 may receive a signal from an external device via the communication unit 400 and provide a control signal to the vehicle driving unit 600 to perform the traveling of the vehicle 100.

The parking out system 740 may control the vehicle 100 to accomplish the parking out of the vehicle 100 automatically.

The parking out system 740 may provide a control signal to the vehicle driving unit 600 to perform the parking out of the vehicle, based on the vehicle traveling information. The vehicle driving system 600 may operate based on the control signal provided by the parking out system 740. Thus, the vehicle may accomplish the parking out of the vehicle 100 automatically.

For example, the parking out system 740 may provide a control signal to the vehicle driving unit 600 to perform the parking out of the vehicle 100, based on the object information provided by the object detection unit 300.

For example, the parking out system 740 may receive a signal from an external device via the communication unit 400 and provide a control signal to the vehicle driving unit 600 to perform the parking out of the vehicle 100.

The parking system 750 may control the vehicle 100 to accomplish the parking of the vehicle 100 automatically.

The parking system 750 may provide a control signal to the vehicle driving unit 600 to perform parking of the vehicle 100, based on the vehicle traveling information. The vehicle driving system 600 may operate based on the control signal provided by the parking system 750. Thus, the vehicle may accomplish the parking of the vehicle 100 automatically.

For example, the parking system 750 may provide a control signal to the vehicle driving unit 600 to perform parking of the vehicle 100, based on the object information provided by the object detection unit 300.

For example, the parking system 750 may receive a signal from an external device via the communication unit 400 and provide a control signal to the vehicle driving unit 600 to perform parking of the vehicle 100.

The navigation system 770 may provide navigation information. The navigation information may include at least one of map information, set destination information, route information, information about various objects on a road, lane information, traffic information, and position information of vehicle.

The navigation system 770 may include a separate memory and a processor. The memory may store the navigation information. The processor may control the operation of the navigation system 770.

According to an embodiment, the navigation system 770 may receive information from an external device via the communication unit 400 and may update pre-stored information.

According to an embodiment, the navigation system 770 may be classified as a subcomponent of the user interface unit 200.

The sensing unit 120 may sense the state of the vehicle. The sensing unit 120 may include a posture sensor (e.g., a yaw sensor, a roll sensor, a pitch sensor), a collision sensor, a wheel sensor, a speed sensor, a tilt sensor, a weight sensor, a heading sensor, a yaw sensor, a gyro sensor, a position module, a vehicle forward/reverse sensor, a battery sensor, a fuel sensor, a tire sensor, a steering sensor for steering wheel rotation, a vehicle interior temperature sensor, a vehicle interior humidity sensor, an ultrasonic sensor, an illumination sensor, an accelerator pedal position sensor, a brake pedal position sensor, and the like.

The sensing unit 120 may acquire a sensing signal relating to vehicle posture information, vehicle collision information, vehicle direction information, vehicle position information (GPS information), vehicle angle information, vehicle speed information, vehicle acceleration information, vehicle tilt information, vehicle forward/backward information, battery information, fuel information, tire information, vehicle lamp information, vehicle interior temperature information, vehicle interior humidity information, steering wheel rotation angle, vehicle exterior illumination, pressure applied to the accelerator pedal, pressure applied to the brake pedal, and the like. The information acquired by the sensing unit 120 may be included in the vehicle traveling information.

The sensing unit 120 may further include an accelerator pedal sensor, a pressure sensor, an engine speed sensor, an air flow sensor (AFS), an air temperature sensor (ATS), a water temperature sensor WTS, a throttle position sensor (TPS), a TDC sensor, a crank angle sensor (CAS), and the like.

The interface unit 130 may serve as a pathway to various external devices connected to the vehicle 100. For example, the interface unit 130 may include a port that can be connected to a mobile terminal, and may be connected to the mobile terminal through the port. In this instance, the interface unit 130 may exchange data with the mobile terminal.

In addition, the interface unit 130 may serve as a pathway for supplying electrical energy to the connected mobile terminal. When the mobile terminal is electrically connected to the interface unit 130, the interface unit 130 may provide the mobile terminal with electric energy supplied from the power supply unit 190, under the control of the controller 170.

The memory 140 may be electrically connected to the controller 170. The memory 140 may store basic data for a unit, control data for controlling the operation of the unit, and input/output data. The memory 140 may be, in hardware, various storage units such as a ROM, a RAM, an EPROM, a flash drive, a hard drive, and the like. The memory 140 may store various data for the overall operation of the vehicle 100, such as a program for processing or controlling the controller 170.

According to an embodiment, the memory 140 may be formed integrally with the controller 170 or may be implemented as a subcomponent of the controller 170.

The power supply unit 190 may supply power necessary for operation of each component, under the control of the controller 170. Particularly, the power supply unit 190 may receive power from a battery or the like inside the vehicle.

The controller 170 may control the overall operation of each unit in the vehicle 100. The controller 170 may be referred to as an electronic control unit (ECU).

The controller 170 may perform the autonomous traveling of the vehicle 100, based on the information acquired through the apparatus provided in the vehicle 100 when the vehicle 100 is in the autonomous mode. For example, the controller 170 may control the vehicle 100, based on the navigation information provided by the navigation system 770 and the information provided by the object detection unit 300 or the communication unit 400. The controller 170 may control the vehicle 100, based on an input signal corresponding to a user command received by the driving operation unit 500, when the vehicle 100 is in the manual mode. The controller 170 may control the vehicle 100, based on a remote control signal received by the communication unit 400, when the vehicle 100 is in the remote control mode.

Various processors and controllers 170 included in the vehicle 100 may be implemented using at least one of application specific integrated circuits (ASICs), digital signal processors (DSPs), digital signal processing devices (DSPDs), programmable logic devices (PLDs) field programmable gate arrays (FPGAs), processors, controllers, micro-controllers, microprocessors, and other electrical units for performing other functions.

In the following description, it is assumed that the operation performed by a leader vehicle or a follower vehicle is performed by apparatuses provided in respective vehicles. For example, an operation that the leader vehicle provides a control signal means that the controller of the leader vehicle transmits a control signal through the communication unit.

Figure 8:
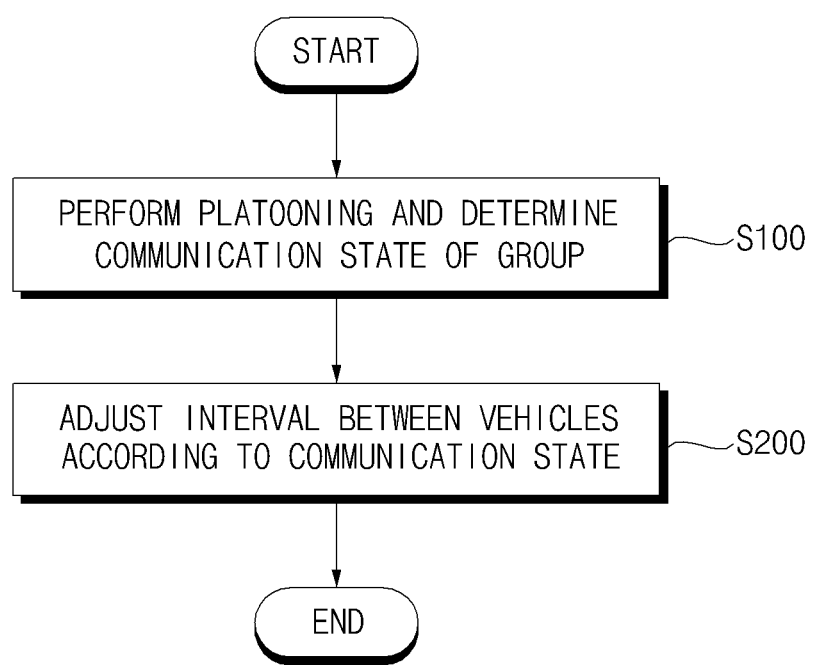
FIG. 8 and FIG. 9 are flowcharts illustrating a process of adjusting a distance between vehicles according to a communication state of a group, in a platooning method according to an embodiment of the present invention.
Figure 9:
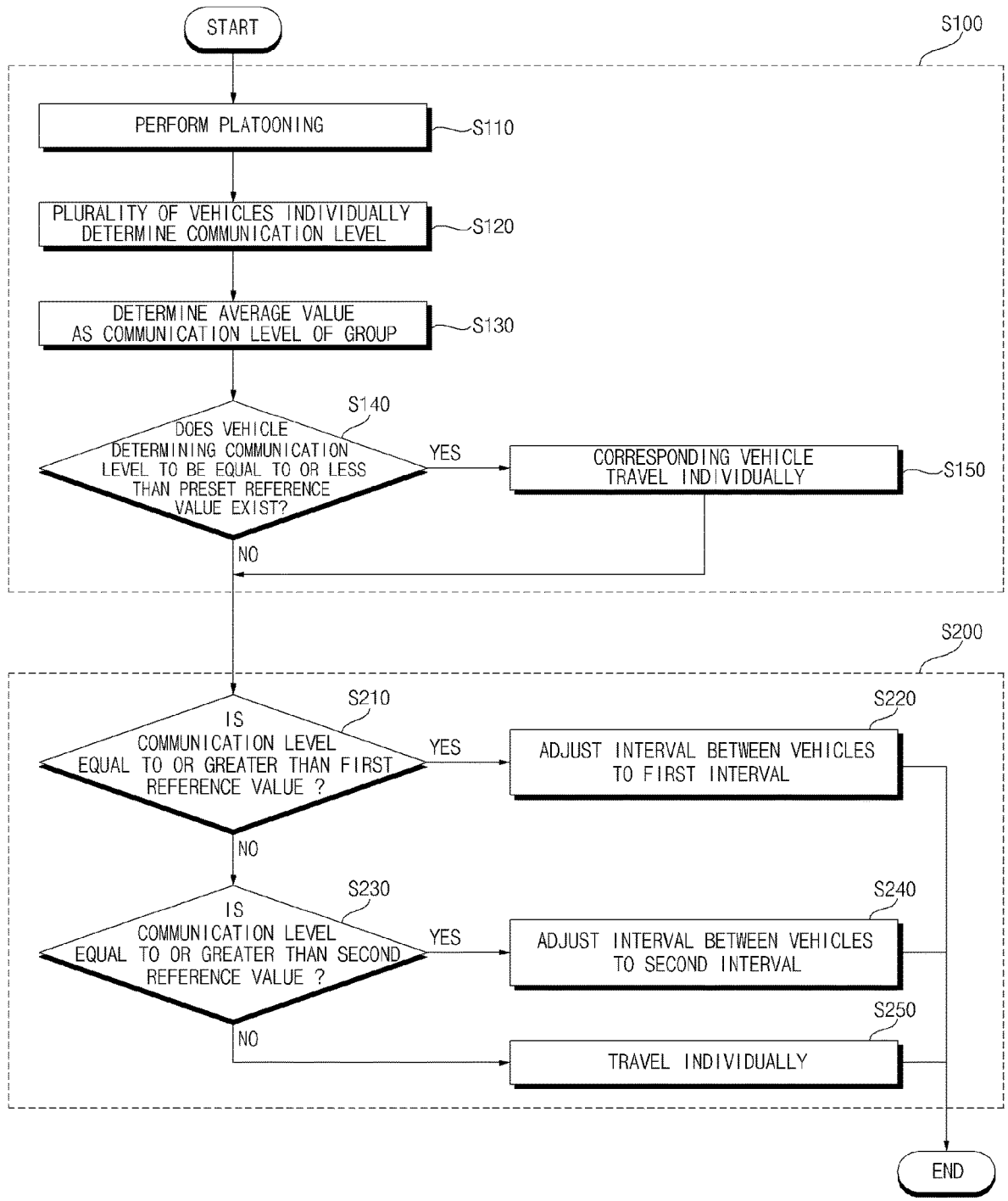

FIG. 8 and FIG. 9 are flowcharts illustrating a process of adjusting a distance between vehicles according to a communication state of a group, in a platooning method according to an embodiment of the present invention.

The platooning method according to an embodiment of the present invention may include a step of determining a communication state of a group (S100), and a step of adjusting a distance between vehicles according to the communication state of the group (S200).

Hereinafter, each step shall be described in detail.

A plurality of vehicles can perform platooning (S100).

A plurality of vehicles that perform platooning can be referred to as a group.

The group can include a single leader vehicle and one or more follower vehicles. The leader vehicle can control one or more follower vehicles.

The leader vehicle and the follower vehicle can perform a V2V (Vehicle to Vehicle) communication using each communication unit.

The communication unit of the leader vehicle can communicate with one or more follower vehicles. The communication unit of the follower vehicle can perform communication with the leader vehicle.

The leader vehicle of the group can provide a control signal. The leader vehicle can transmit a control signal for controlling the follower vehicle to the follower vehicle. The controller of the leader vehicle can provide the control signal to one or more follower vehicles so that the leader vehicle and one or more follower vehicles may perform platooning.

The controller of the leader vehicle can transmit a control signal through the communication unit. The leader vehicle may control the follower vehicle by providing the control signal.

One or more follower vehicles included in the group can travel according to the control signal. The follower vehicle may travel based on the control signal transmitted by the leader vehicle. The controller of the follower vehicle can receive the control signal transmitted by the leader vehicle through the communication unit, and control the vehicle driving unit based on the received control signal.

The follower vehicle may provide the leader vehicle with information relating to its own position and operating state. The leader vehicle can determine the position and the operation state of the follower vehicle, based on the information provided by the follower vehicle.

During the platooning, the communication state of the group can be determined (S100).

The communication state of the group is a communication state of the leader vehicle and one or more follower vehicles.

The communication state of the group can be determined based on at least one of the congestion of the channel used for the communication of the group, the reception sensitivity, the packet error ratio (PER), the received signal strength indication (RSSI), the signal-to-noise ratio (SNR), and the signal-to-interference-plus-noise ratio (SINR).

The congestion of the channel used for the communication of the group represents an extent to which a specific frequency bandwidth used for communication between the leader vehicle and one or more follower vehicles is used. For example, as the data transmitted through a specific frequency bandwidth are more increased, it can be seen that the congestion of the channel is increased.

The reception sensitivity is a reception sensitivity of the leader vehicle or one or more follower vehicles. The reception sensitivity can be determined according to bit error rate (BER). The bit error rate is a probability that an error will occur in the transmitted data.

The communication state of the group can be expressed by a communication level indicating the degree of smooth communication. In other words, communication level indicates the degree of a quality of the communication. For example, the communication level can be expressed as a number. For example, when the communication level is expressed as a number, if a communication level value becomes larger, it may be defined as a smooth communication state. That is, the communication state of the group is expressed as the communication level of the group.

The communication state of the group may be determined by at least one of the one or more follower vehicles included in the group, the leader vehicle, and a road infrastructure. The road infrastructure may be a communication apparatus installed on a road.

At least one of the follower vehicles, the leader vehicle, and the road infrastructure can determine the communication level, based on at least one of the channel congestion, the reception sensitivity, the packet error ratio (PER), the received signal strength indication (RSSI), the signal-to-noise ratio (SNR), and the signal-to-interference-plus-noise ratio (SINR).

The follower vehicles, the leader vehicle, and the road infrastructure of the present invention may include a chipset capable of determining at least one of the channel congestion, the reception sensitivity, the PER, the RSSI, the signal-to-noise ratio, and the signal-to-interference-plus-noise ratio.

According to an embodiment of the present invention, the communication level of the group may be determined by a plurality of vehicles included in the group.

Each of the plurality of vehicles included in the group may individually determine the communication level.

One or more follower vehicles included in the group can transmit the determined communication level value to the leader vehicle.

The leader vehicle of the group may calculate the average value or the minimum value of the plurality of communication level values determined by the plurality of vehicles included in the group, based on the communication level value transmitted by one or more follower vehicles and the communication level value determined by the leader vehicle itself.

The leader vehicle may determine the average value or the minimum value of the communication level values as the communication level of the group.

According to another embodiment of the present invention, the communication level of the group may be determined by the leader vehicle.

The leader vehicle can determine the communication level determined by the leader vehicle itself as the communication level of the group.

The controller of the leader vehicle can determine the communication state of the leader vehicle and one or more follower vehicles, through the communication unit.

According to another embodiment of the present invention, the communication level of the group can be determined by the road infrastructure which is the communication equipment installed on the road.

When the group is positioned within a certain distance from the road infrastructure, the road infrastructure can receive a signal transmitted by at least one of the plurality of vehicles included in the group.

The road infrastructure may determine at least one of the channel congestion, the reception sensitivity, the PER, the RSSI, the signal-to-noise ratio, and the signal-to-interference-plus-noise ratio, based on the received signal.

The road infrastructure may determine the communication level of the channel congestion, the reception sensitivity, the PER, the RSSI, the signal-to-noise ratio, and the signal-to-interference-plus-noise ratio.

The road infrastructure may transmit a determined communication level value to the leader vehicle of the group, when the communication level of the group is determined.

The leader vehicle can determine the communication level of the group, based on the communication level value transmitted by the road infrastructure.

The leader vehicle may adjust a distance between the platooning vehicles, based on the communication state of the group (S200).

The controller of the leader vehicle may adjust the distance between the platooning vehicles, based on the communication state of the leader vehicle and one or more follower vehicles.

The controller of the leader vehicle can adjust the distance between the vehicles, based on the determined communication level of the group.

The controller of the leader vehicle can determine a distance between the vehicles included in the group, based on the communication level of the group. In this instance, the distance determined by the leader vehicle may be referred to as a first distance.

The controller of the leader vehicle may provide a control signal to one or more follower vehicles so that the distance between the vehicles included in the group can be the determined first distance.

As one or more follower vehicles included in the group move according to the control signal, the distance of the vehicles in the group become the first distance.

When the communication state of the group is smooth, the follower vehicle may be controlled quickly and accurately by the control signal of the leader vehicle. However, when the communication state of the group is not smooth, the control accuracy of the speed of the follower vehicle may be relatively lowered.

When the control accuracy of the speed of the follower vehicle is lowered, a collision between the vehicles included in the group may occur. Hence, the method of platooning according to an embodiment of the present invention increases the distance between the vehicles included in the group as the communication state of the group is deteriorated, thereby reducing the possibility of collision between the vehicles included in the group.

FIG. 9 is a flowchart illustrating a detailed process of adjusting the distance between vehicles according to the communication state of a group, in the platooning according to an embodiment of the present invention.

The leader vehicle and one or more follower vehicles can perform platooning (S110).

During the platooning, the plurality of vehicles included in the group may individually determine the communication level (S120).

The leader vehicle may determine the average value or the minimum value of the communication level determined by the plurality of vehicles included in the group as the communication level of the group (S130).

One or more follower vehicles included in the group can transmit the determined communication level value to the leader vehicle. The leader vehicle of the group can calculate the average value or the minimum value of the plurality of communication level values determined by the plurality of vehicles included in the group, based on the communication level value transmitted by one or more follower vehicles and the communication level value determined by the leader vehicle itself.

The leader vehicle can determine whether a vehicle, which determines that the communication level is equal to or less than a preset reference value, exists among the plurality of vehicles included in the group (S140).

The reference value is a value stored in the memory of the leader vehicle.

In the platooning method of the present invention, during the platooning, a vehicle having a poor communication state withdraws from the group. The vehicle determining that the communication level is equal to or less than the reference value can be regarded as having a poor communication state. That is, the reference value is a value for determining whether the communication state of a specific vehicle is poor.

Among the plurality of vehicles included in the group, the vehicle determining that the communication level is equal to or less than a preset reference value travels individually to the destination of the group (S150)

When there is a vehicle (hereinafter, referred to as 'faulty vehicle') determining that the communication level is equal to or less than the preset reference value among the plurality of vehicles included in the group, the leader vehicle can provide a control signal to the faulty vehicle so that the faulty vehicle withdraws from the group and travels individually. Alternatively, when there is a faulty vehicle determining that the communication level is equal to or less than the preset reference value among the plurality of vehicles included in the group, the faulty vehicle, e.g., a follower vehicle can decide to leave the group and to travel individually.

The faulty vehicle can depart the rank of the group, based on the control signal received from the leader vehicle. The faulty vehicle, after departing from the rank of the group, may ignore the control signal of the leader vehicle and travel individually. In this instance, the faulty vehicle may travel in the autonomous mode that enables to travel without driver's control, or in the manual mode that enables to travel according to the operation of the driver.

The leader vehicle may provide a signal to inform the faulty vehicle of the destination of the group. The faulty vehicle can determine the destination of the group, based on the signal provided by the leader vehicle. When the faulty vehicle enters the autonomous mode, the faulty vehicle may autonomously travel to the destination of the group. When the faulty vehicle enters the manual mode, an image indicating the destination of the group may be output through a display apparatus.

Accordingly, even if the faulty vehicle departs from the group, it can travel to the destination of the group. Further, according to the platooning method of the present invention, even if a vehicle is in an abnormal communication state, the vehicle travels separately to the destination of the group after departing from the group, so that collision between vehicles in the group can be prevented, and all vehicles included in the group can travel to the same destination.

The leader vehicle can adjust the distance between the vehicles included in the group to be in inverse proportion to the communication level of the group The controller of the leader vehicle can determine whether the communication level of the group is equal to or greater than a first reference value (S210).

The first reference value is a value stored in the memory of the leader vehicle. The first reference value is a reference value for determining that the communication state of the group is good. If the communication level of the group is equal to or greater than the first reference value, the communication state of the group can be considered to be good. The first reference value may be determined by experiment.

The controller of the leader vehicle may adjust the distance between the vehicles included in the group to a preset first distance, when the communication level of the group is determined to be equal to or greater than the first reference value (S220).

The controller of the leader vehicle can determine the distance between the plurality of vehicles included in the group as the preset first distance, when it is determined that the communication level of the group is equal to or greater than the first reference value.

The controller of the leader vehicle can transmit a control signal to one or more follower vehicles so that the distance between the plurality of vehicles included in the group can become the first distance. One or more follower vehicles can move according to the control signal transmitted by the leader vehicle.

If one or more follower vehicles move based on the control signal transmitted by the leader vehicle, the distance between the vehicles included in the group can become the first distance.

The first distance is a preset value and may be stored in the memory of the leader vehicle.

The first distance may be a minimum distance that the vehicles should maintain while performing the platooning when the communication state is good.

When the communication level of the group is equal to or greater than the first reference value, the communication state of the group is good, so that the leader vehicle can control the follower vehicle relatively quickly and accurately. Since the follower vehicle can be controlled relatively quickly and accurately, the possibility of collision between vehicles is low even if the distance between the vehicles included in the group is minimized. Accordingly, in the platooning method according to an embodiment of the present invention, if it is determined that the communication state of the group is good, the distance of the vehicles in the group can be adjusted to a preset minimum distance.

If the communication level of the group is determined to be less than the first reference value, the controller of the leader vehicle can determine whether the communication level of the group is equal to or greater than a second reference value (S230).

The second reference value is a value stored in the memory of the leader vehicle. The second reference value is a reference value for determining that the communication state of the group is not good but that the platooning can be accomplished by widening the distance between the vehicles. Accordingly, when the communication level of the group is equal to or greater than the second reference value, it can be seen that the communication state is not good, but the platooning can be accomplished by widening the distance between the vehicles. The second reference value can be determined by experiment.

When the communication level of the group is less than the first reference value and is equal to or greater than the second reference value, the controller of the leader vehicle may adjust the distance between the vehicles included in the group to a second distance larger than the first distance (S240).

The controller of the leader vehicle may determine the distance between the plurality of vehicles included in the group as the second distance larger than the first distance, when it is determined that the communication level of the group is less than the first reference value and is equal to or greater than the second reference value.

The controller of the leader vehicle can transmit a control signal to one or more follower vehicles so that the distance between the plurality of vehicles included in the group can become the second distance. One or more follower vehicles can move according to the control signal transmitted by the leader vehicle.

When one or more follower vehicles move based on the control signal transmitted by the leader vehicle, the distance between the vehicles included in the group may become the second distance.

The second distance is a preset value, and may be stored in the memory of the leader vehicle.

The second distance may be greater than the first distance.

When the communication level of the group is equal to or greater than the second reference value, the communication state is not good but the platooning can be performed by widening the distance between the vehicles. In this instance, since the control of the leader vehicle for the follower vehicle may be relatively slow and inaccurate, a distance between the vehicles included in the group should be secured to a certain extent. Accordingly, in the platooning method according to an embodiment of the present invention, when it is determined that the communication state of the group is not good, the distance between the vehicles in the group can be adjusted to a distance longer than a preset minimum distance.

When it is determined that the communication level of the group is less than the second reference value, the vehicles of the group travel individually to the destination of the group (S250).

When the communication level of the group is determined to be less than the second reference value, the leader vehicle can provide a control signal so that the vehicles of the group can travel individually to the destination of the group.

When the communication level of the group is less than the second reference value, the communication state of the group is poor and the platooning cannot be achieved.

Accordingly, when the communication level of the group is less than the second reference value, the leader vehicle may not perform platooning any more, but the vehicles in the group may travel individually.

However, even in this instance, the leader vehicle may transmit information on the preset destination of the group to one or more follower vehicles, so that all the vehicles in the group travel to the same destination.

When the communication level of the group is determined to be less than the second reference value, the leader vehicle can provide a control signal so that one or more follower vehicles can depart from the rank of the group and can travel individually. When receiving the control signal, one or more follower vehicles may depart from the rank of the group and may autonomously travel individually or enter the manual mode.

Figure 10:
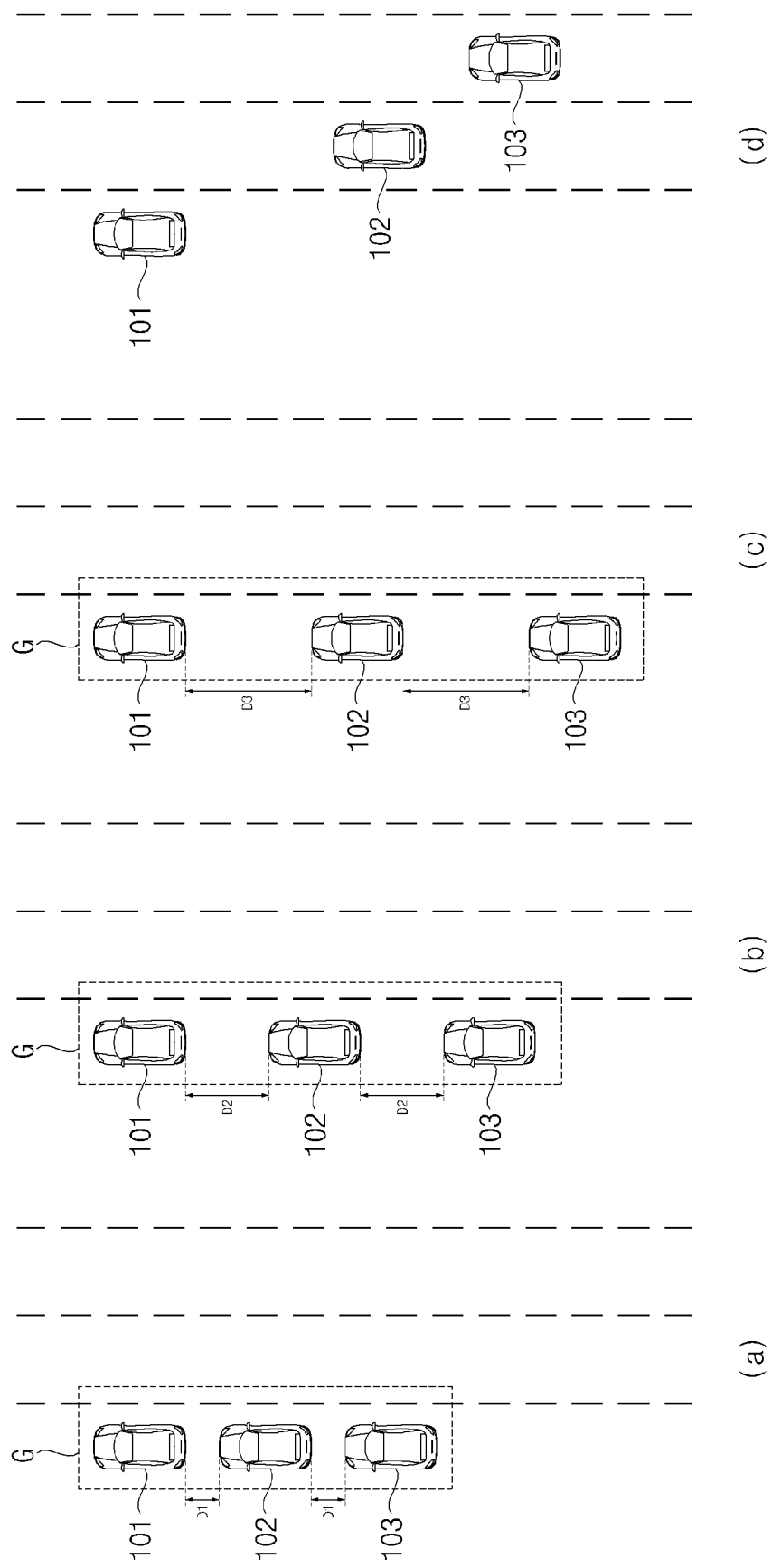
FIG. 10(a)-(d) is a diagram illustrating a process of adjusting a distance between vehicles in a group or traveling individually according to a communication state of a group, in a platooning method according to an embodiment of the present invention.

FIG. 10 is a diagram illustrating a process of adjusting a distance between vehicles in a group or traveling individually according to a communication state of a group, in a platooning method according to an embodiment of the present invention.

Referring to FIG. 10, unlike FIG. 9, the reference value for determining the communication level and the preset distance value for the distance between the vehicles can be divided into three or more, respectively.

In the embodiment of FIG. 10, the reference value for determining the communication level is three (first, second, and third reference values), and the preset value for the distance between the vehicles is three (first, second, and third distances).

Referring to FIG. 10(a), when the communication level of a group G is determined to be equal to or greater than the first reference value, a leader vehicle 101 can adjust the distance of vehicles 101, 102, 103 of the group G to a first distance (D1).

The first reference value can be larger than the second reference value and the third reference value.

The first distance may be smaller than the second distance and the third distance.

The leader vehicle 101 may transmit a control signal so that the first follower vehicle 102 and the second follower vehicle 103 may travel respectively at a position spaced apart from the preceding vehicle by the first distance D1.

The first follower vehicle 102 and the second follower vehicle 103 can move to a position spaced apart from the preceding vehicle by the first distance D1, based on the control signal transmitted by the leader vehicle 101.

Thus, the distance between the vehicles 101, 102, 103 included in the group G can be adjusted to the first distance D1.

Referring to FIG. 10(b), when the communication level of the group G is less than the first reference value and is equal to or greater than the second reference value, the leader vehicle 101 may adjust the distance of vehicles 101, 102, 103 of the group G to a second distance D2.

The second reference value may be smaller than the first reference value and may be larger than the third reference value.

The second distance can be larger than the first distance and may be smaller than the third distance.

The leader vehicle 101 may transmit the control signal so that the first follower vehicle 102 and the second follower vehicle 103 may travel respectively at a position spaced apart from the preceding vehicle by the second distance D2.

The first follower vehicle 102 and the second follower vehicle 103 can move to a position spaced apart from the preceding vehicle by the second distance D2, based on the control signal transmitted by the leader vehicle 101.

Thus, the distance between the vehicles 101, 102, 103 included in the group G may be adjusted to the second distance D2.

Referring to FIG. 10(c), when the communication level of the group G is less than the second reference value and is equal to or greater than the third reference value, the leader vehicle 101 may adjust the distance of vehicles 101, 102, 103 of the group G to a third distance D3.

The third reference value may be smaller than the first reference value and can be larger than the second reference value.

The third distance can be larger than the first distance and can be smaller than the second distance.

The leader vehicle 101 can transmit the control signal so that the first follower vehicle 102 and the second follower vehicle 103 can travel respectively at a position spaced apart from the preceding vehicle by the third distance D3.

The first follower vehicle 102 and the second follower vehicle 103 may move to a position spaced apart from the preceding vehicle by the third distance D3, based on the control signal transmitted by the leader vehicle 101.

Thus, the distance between the vehicles 101, 102, 103 included in the group G may be adjusted to the third distance D3.

Referring to the embodiments of FIG. 10(a) to FIG. 10(c), in the platooning method of the present invention, the distance between the vehicles 101, 102, 103 included in the group G increases as the communication level of the group G is lowered. That is, the communication level of the group G and the distance between the vehicles 101, 102, 103 included in the group G are in inverse proportion. This is because it is possible to prevent the collision between the vehicles 101, 102 and 103 in the group G by increasing the distance between the vehicles 101, 102 and 103 in the group G, as the communication state of the group G is lowered.

Referring to FIG. 10(*d*), when the communication level of the group G is determined to be less than the third reference value, the leader vehicle 101 can transmit a control signal so that the vehicles 101, 102 and 103 included in the group G can travel individually to the destination of the group G.

When the communication level of the group G is less than the third reference value, the communication state of the group G is so poor, so that the plurality of vehicles 101, 102, and 103 cannot perform platooning.

The first follower vehicle 102 and the second follower vehicle 103 can depart from the group G respectively based on the control signal transmitted by the leader vehicle 101, and travel individually. In this instance, the first follower vehicle 102 and the second follower vehicle 103 can travel without the control signal of the leader vehicle 101.

The leader vehicle 101 can transmit information on the preset destination of the group to the first follower vehicle 102 and the second follower vehicle 103.

The leader vehicle 101, the first follower vehicle 102, and the second follower vehicle 103 can travel to the destination of the group respectively.

Accordingly, even in a situation where the plurality of vehicles 101, 102, and 103 cannot perform platooning, it is possible to continuously move toward the same destination.

Figure 11:
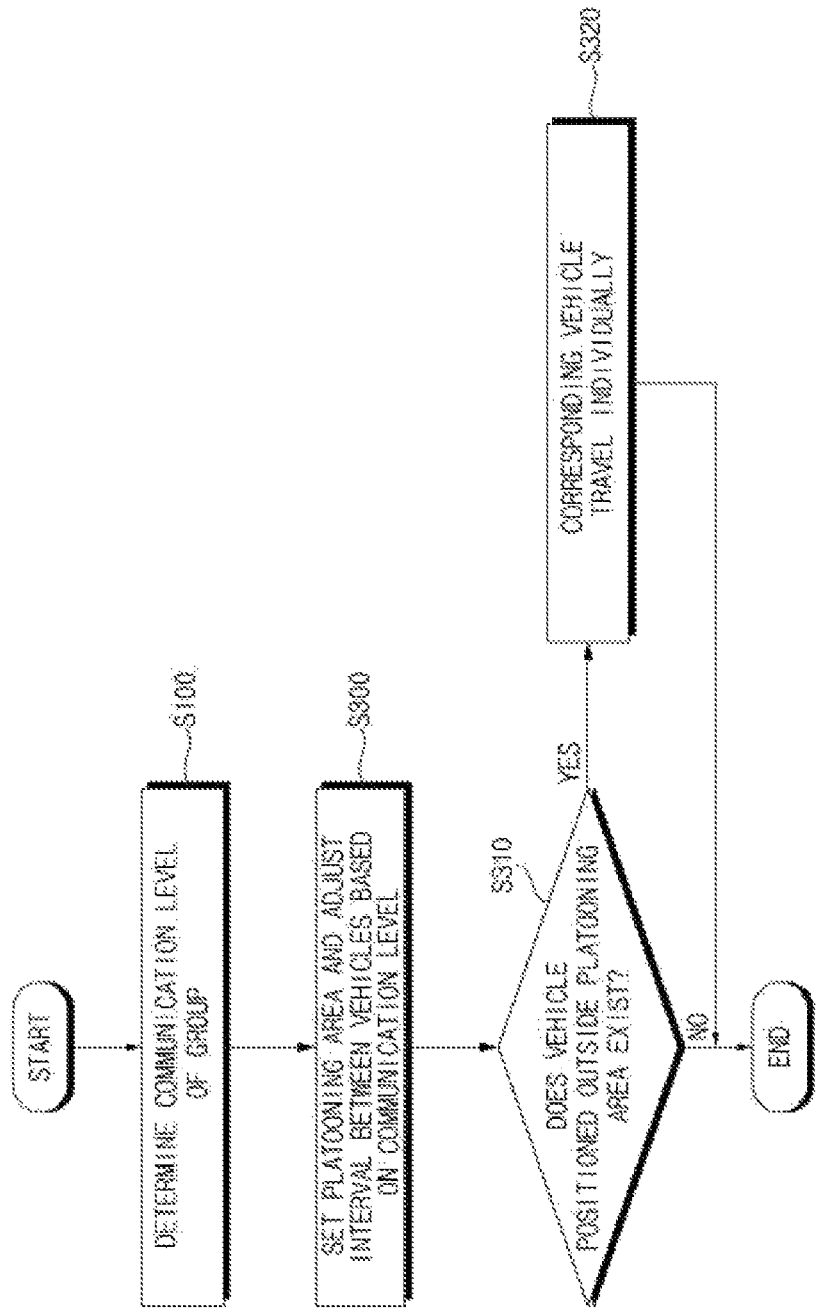
FIG. 11 and FIG. 12(a)-(c) are diagrams illustrating a process in which a vehicle departing from a platooning area travels individually, in a platooning method according to an embodiment of the present invention.
Figure 12:
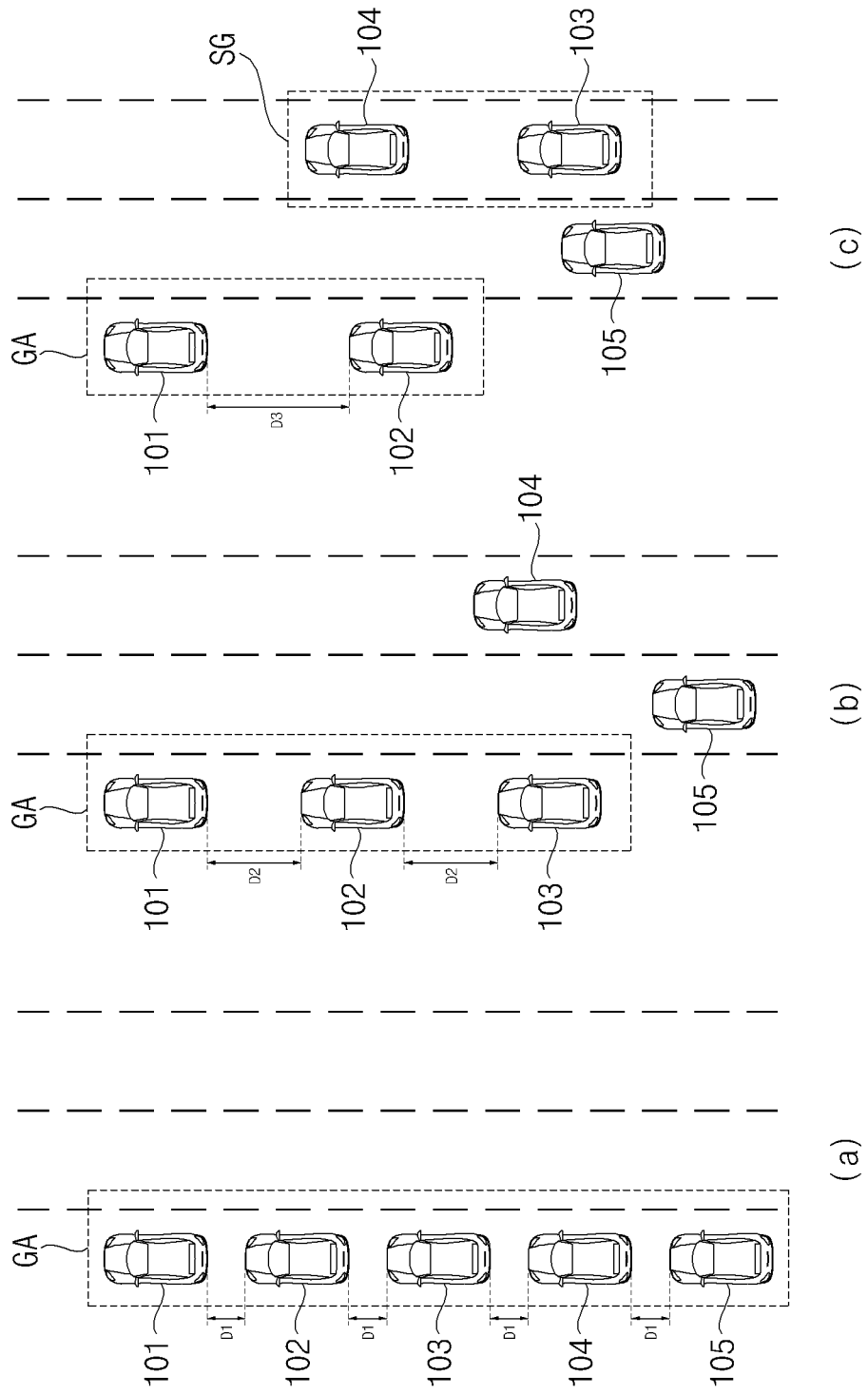

FIG. 11 and FIG. 12 are diagrams illustrating a process in which a vehicle departing from a platooning area travels individually, in the platooning method according to an embodiment of the present invention.

Referring to FIG. 11, in the platooning method according to an embodiment of the present invention, the vehicles included in the group may perform platooning within a set platooning area.

The leader vehicle may determine the communication level of the group (S100).

The leader vehicle can adjust the distance between the vehicles included in the group based on the communication level of the group (S300).

Further, the leader vehicle may set a platooning area, based on the communication level of the group (S300).

The distance adjustment of the vehicles and the platooning area setting may be performed simultaneously or sequentially.

The platooning area can be a virtual zone that restricts the position of vehicles included in the group. The platooning area can be a zone having a length of a certain distance rearward from the position of the leader vehicle.

The leader vehicle can set the platooning area so that the size of the platooning area can be proportional to the communication level. This shall be described with reference to FIG. 12.

Referring to FIG. 12(*a*), when it is determined that the communication level of the group is equal to or greater than a first reference value, the leader vehicle can set the platooning area to a preset first size.

The data for the first size can be stored in the memory. The first size can be a value determined by experiment. The first size can be the largest value among the preset sizes of the platooning area.

The platooning area can be affected by a communication range of the leader vehicle. Since the communication range of the leader vehicle becomes larger as the communication state of the group becomes better, the platooning area may be set larger as the communication state of the group becomes better.

According to the platooning method of the present invention, when the communication level of the group is equal to or greater than the first reference value, the communication state of the group is good, and therefore, the platooning area may be set to the maximum.

Referring to FIG. 12(*b*), when the communication level of the group is less than the first reference value and is equal to or greater than a second reference value smaller than the first reference value, the leader vehicle can set the platooning area to a second size set to be smaller than the first size.

The data for the second size can be stored in the memory. The second size can be a value determined by experiment.

Referring to FIG. 12(*c*), when the communication level of the group is less than the second reference value and is equal to or greater than a third reference value smaller than the second reference value, the leader vehicle may set the platooning area to a third size set to be smaller than the second size.

The data for the third size may be stored in the memory. The third size can be a value determined by experiment.

When the leader vehicle sets the platooning area, the vehicles included in the group can perform platooning within a set platooning area.

Thus, the leader vehicle can provide a control signal so that one or more follower vehicles included in the group may travel within the platooning area. One or more follower vehicles may perform platooning within the set platooning area, based on the control signal.

During the platooning, when the platooning area is set and the distance between the vehicles included in the group is adjusted, among one or more follower vehicles, a vehicle that departs from the platooning area may occur.

The leader vehicle can determine whether a vehicle positioned outside the platooning area exists among one or more follower vehicles, as the platooning area is set and the distance between the vehicles included in the group is adjusted (S310).

During the platooning, one or more follower vehicles can transmit a signal indicating their respective positions and operating states to the leader vehicle. The leader vehicle can determine the position and operating state of one or more follower vehicles, based on the signal transmitted by the follower vehicle.

The leader vehicle may determine whether a vehicle positioned outside the platooning area exists among one or more follower vehicles, based on the signal transmitted by the follower vehicle.

When it is determined that a vehicle (hereinafter referred to as 'departure vehicle') positioned outside the platooning area exists among one or more follower vehicles, the leader vehicle may transmit a control signal so that the departure vehicle may individually travel to a preset destination of the group. (S320). This shall be described in detail with reference to FIGS. 12(*b*) and 12(*c*).

Referring to FIG. 12(*b*), the leader vehicle 101 can adjust the distance between the vehicles included in the group to the second distance D2, and set a platooning area GA, based on the communication level of the group.

Accordingly, a third follower vehicle 104 and a fourth follower vehicle 105 can be positioned outside the platooning area GA.

The leader vehicle 101 may provide a control signal so that the third follower vehicle 104 and the fourth follower vehicle 105 may depart from the rank of the group and travel individually. The leader vehicle 101 may provide a signal informing the third follower vehicle 104 and the fourth follower vehicle 105 of the destination of the group.

The third follower vehicle 104 and the fourth follower vehicle 105 may ignore the control signal of the leader vehicle 101 and travel individually after departing from the rank of the group. The third follower vehicle 104 and the fourth follower vehicle 105 can individually travel to the destination of the group determined based on the signal provided by the leader vehicle 101.

Referring to FIG. 12(c), the leader vehicle 101 can adjust the distance between the vehicles included in the group to the third distance D3, and set a platooning area GA, based on the communication level of the group.

Accordingly, a second follower vehicle 103, the third follower vehicle 104, and the fourth follower vehicle 105 can be positioned outside the platooning area GA.

The leader vehicle 101 may provide a control signal so that the second follower vehicle 103, the third follower vehicle 104, and the fourth follower vehicle 105 may depart from the rank of the group and travel individually.

In this instance, the leader vehicle 101 can provide a control signal so that the second follower vehicle 103 and the third follower vehicle 104 may perform platooning as a subgroup SG. The leader vehicle 101 may provide a control signal so that either the second follower vehicle 103 or the third follower vehicle 104 may become a sub-leader vehicle of the subgroup SG. In the embodiment of the drawing, the leader vehicle 101 can provide a control signal so that the third follower vehicle 104 can become a sub-leader vehicle. The third follower vehicle 104 can control the second follower vehicle 103 as a sub-leader vehicle. The third follower vehicle 104 may control the second follower vehicle 103 to perform platooning of the subgroup SG. The second follower vehicle 103 may move according to the control signal transmitted by the third follower vehicle 104.

The leader vehicle 101 may provide a signal informing the third follower vehicle 104 and the fourth follower vehicle 105 of the destination of the group. The leader vehicle 101 can provide a signal informing the third follower vehicle 104, which is the sub-leader vehicle of the subgroup SG, of the destination of the group.

The subgroup SG and the fourth follower vehicle 105 can depart from the rank of the group and, then, can ignore the control signal of the leader vehicle 101 and travel individually. The subgroup SG and the fourth follower vehicle 105 may individually travel to the destination of the group determined based on the signal provided by the leader vehicle 101.

Thus, among one or more follower vehicles, as the platooning area is set and the distance between the vehicles is adjusted, the vehicles positioned outside the platooning area may individually travel to the destination of the group.

In another embodiment of the present invention, when the communication state of the group is changed during the platooning, the leader vehicle may re-adjust the distance between the vehicles included in the group and reset the platooning area, based on the changed communication state.

Among one or more followers included in the group, the leader vehicle can enable the vehicle (departure vehicle) that departs from the platooning area to individually travel as the distance between the vehicles is re-adjusted and the platooning area is reset.

The leader vehicle can control the departure vehicle to depart from the rank of the group and travel to the destination of the group. After departing from the rank of the group, the departure vehicle can ignore the control signal of the leader vehicle and may travel individually. When the leader vehicle provides a signal indicating the destination of the group, the departure vehicle may travel to the destination of the group determined based on the received signal.

Figure 13:
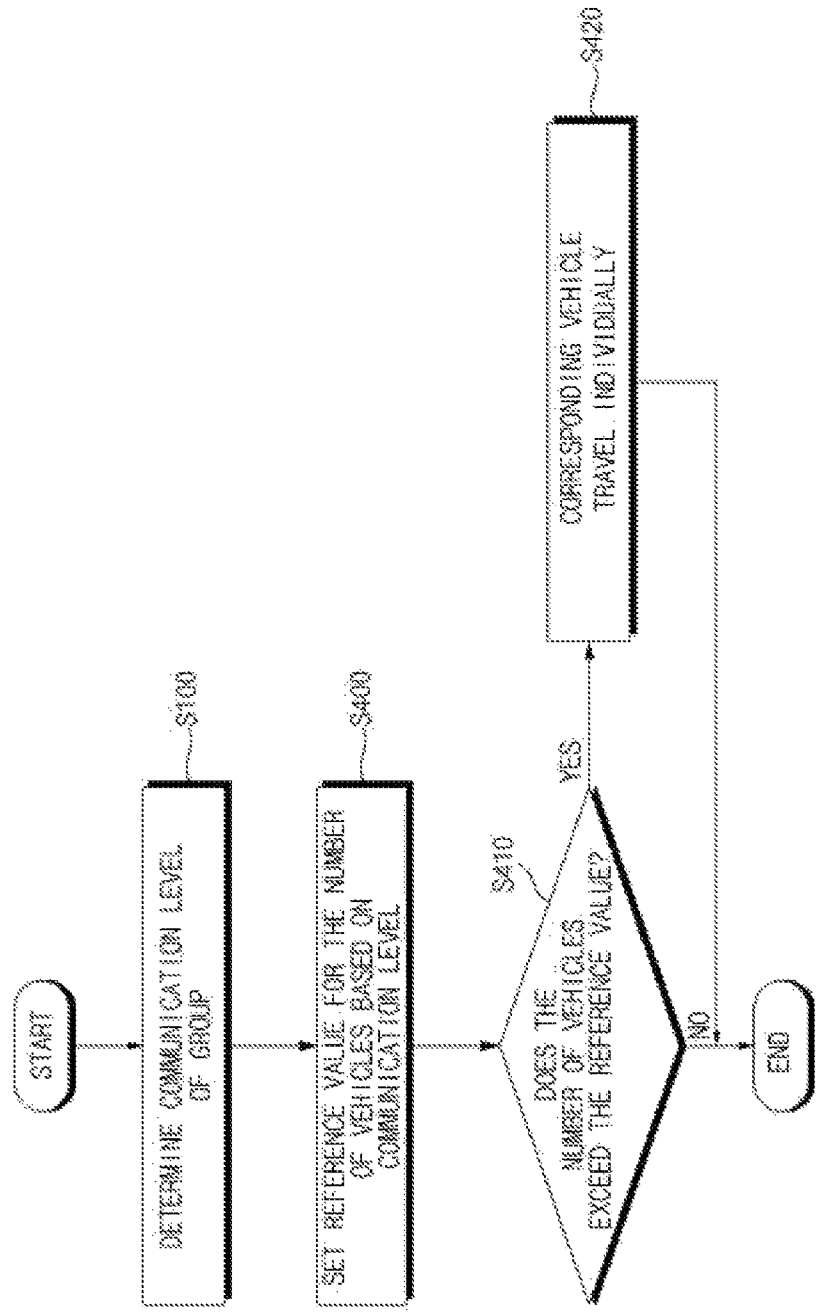
FIG. 13 and FIG. 14(a)-(b) are diagrams illustrating a process of restricting of the number of vehicles included in a group according to the communication state of the group, in a platooning method according to an embodiment of the present invention.
Figure 14:
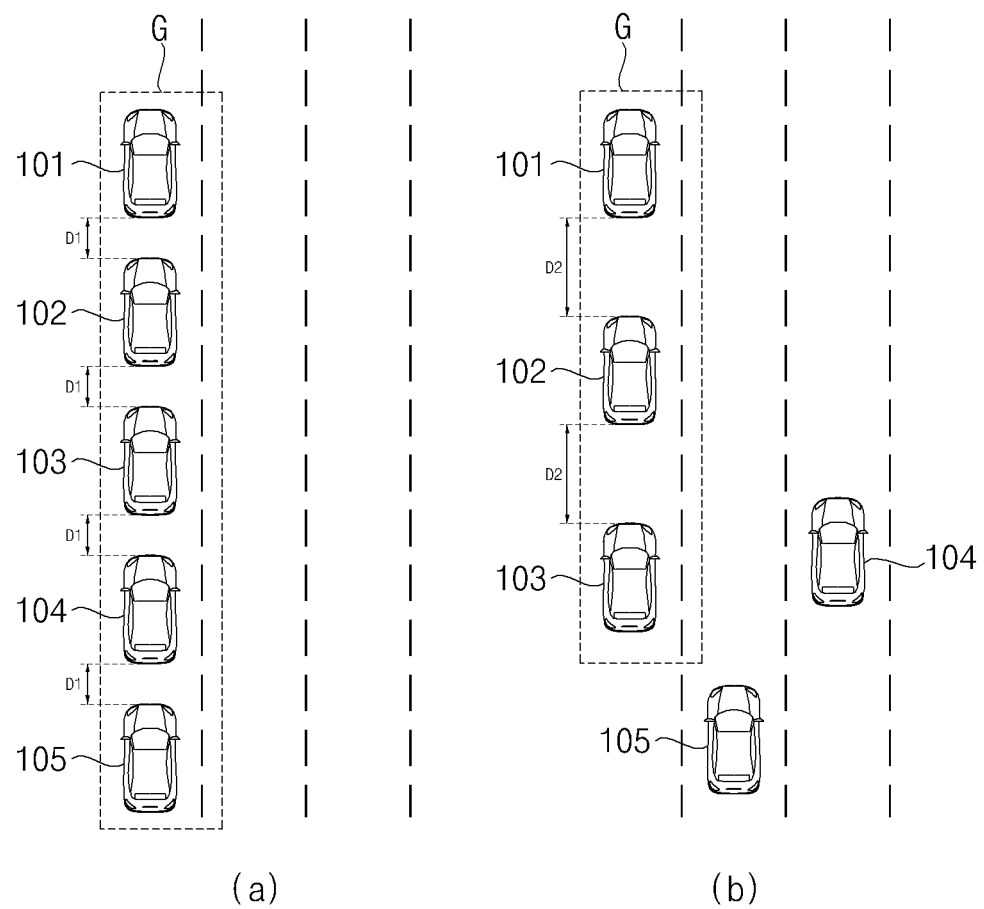

FIG. 13 and FIG. 14 are diagrams illustrating a process of restricting of the number of vehicles included in a group according to the communication state of the group, in a platooning method according to an embodiment of the present invention.

The leader vehicle may determine the communication level of the group (S100).

The leader vehicle can set a reference value (hereinafter, referred to as 'vehicle number restriction value') for the number of vehicles in the group, based on the communication level of the group (S400).

The vehicle number restriction value can be a value for restricting the number of vehicles included in the group. The vehicle number restriction value can be stored in the memory and determined by experiment.

The leader vehicle can set the vehicle number restriction value so that the vehicle number restriction value may be proportional to the communication level of the group. This will be described with reference to FIG. 14.

Referring to FIG. 14(a), the leader vehicle 101 may determine that the communication level of the group G is equal to or greater than the first reference value.

The leader vehicle 101 can set the vehicle number restriction value to 5, when the communication level of the group G is equal to or greater than the first reference value.

Referring to FIG. 14(b), the leader vehicle 101 can determine that the communication level of the group G is less than the first reference value.

The leader vehicle 101 can set the vehicle number restriction value to 3, when the communication level of the group G is less than the first reference value.

As described above, the leader vehicle 101 can set the vehicle number restriction value to become larger as the communication level of the group G becomes larger. The leader vehicle 101 may set the vehicle number restriction value to become smaller as the communication level of the group G becomes smaller.

The leader vehicle may provide a control signal so that the number of vehicles in the group may be equal to or less than the vehicle number restriction value (S410, S420).

The leader vehicle may determine whether the number of vehicles included in the group exceeds the vehicle number restriction value (S410).

The leader vehicle can determine whether the number of vehicles included in the group exceeds the vehicle number restriction value, based on the information transmitted by the follower vehicles included in the group.

When the number of vehicles included in the group exceeds the vehicle number restriction value, the leader vehicle can provide a control signal so that follower vehicles corresponding to the number of vehicles exceeding the vehicle number restriction value among vehicles included in the platooning can travel individually to the destination of the group (S420).

Referring to FIG. 14, in the situation of (a), the vehicle number restriction value may be set to 5, but in the situation of (b), the vehicle number restriction value may be set to 3.

When the vehicle number restriction value is set to 3, since 5 vehicles are included in the group G, the leader vehicle may determine that the number of vehicles included in the group G exceeds the vehicle number restriction value by 2.

The leader vehicle 101 can provide a control signal so that two vehicles 104 and 105 positioned behind the group G among one or more follower vehicles can travel individually.

When receiving the control signal transmitted by the leader vehicle 101, the two vehicles 104 and 105 can depart from the rank of the group G and travel individually.

The leader vehicle 101 can transmit a signal informing the two vehicles 104 and 105 of the destination of the group G. The two vehicles 104 and 105 can travel to the destination of the group G determined based on the signal transmitted by the leader vehicle 101.

In another embodiment of the present invention, when the communication state of the group is changed during the platooning, the leader vehicle can reset the vehicle number restriction value, based on the changed communication state.

The leader vehicle may enable the vehicles (departure vehicle) corresponding to the number of vehicles which exceeds the vehicle number restriction value as the vehicle number restriction value is reset, among one or more follower vehicles included in the group, to travel individually.

The leader vehicle may control the departure vehicle to depart from the rank of the group and travel to the destination of the group. After departing from the rank of the group, the departure vehicle may ignore the control signal of the leader vehicle and travel individually. When the leader vehicle provides a signal indicating the destination of the group, the departure vehicle can travel to the destination of the group determined based on the received signal.

Figure 15:
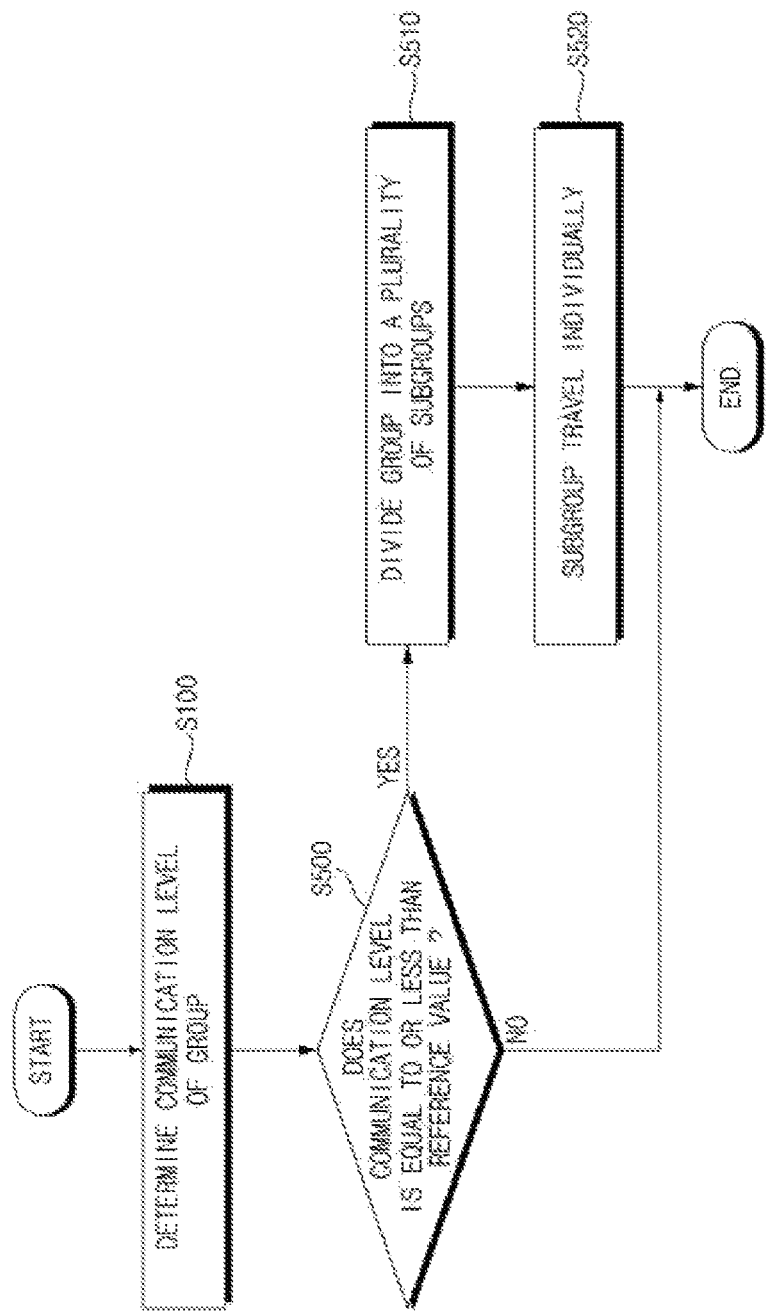

FIG. 15 and FIG. 16 are diagrams illustrating a process in which a group is divided into a plurality of subgroups according to the communication state of the group, in a platooning method according to an embodiment of the present invention.

The leader vehicle can determine the communication level of the group (S100).

The leader vehicle can determine whether the communication level of the group is equal to or less than a reference value (hereinafter, referred to as a fourth reference value) (S500).

The fourth reference value can be a reference value for determining whether the communication state of the group is poor, and can be determined by experiment. The fourth reference value may be stored in the memory of the leader vehicle.

When it is determined that the communication level of the group is equal to or less than the fourth reference value, the leader vehicle may divide the group into a plurality of subgroups (S510).

The plurality of subgroups may include a single sub-leader vehicle and one or more follower vehicles respectively.

The plurality of subgroups have the same destination. The destinations of the plurality of subgroups can be the destinations of the group before being divided.

A plurality of divided subgroups can perform platooning individually (S520).

A plurality of sub-leader vehicles can provide a control signal to the follower vehicles of the subgroup to which each sub-leader vehicle belongs.

Thus, the plurality of subgroups can perform platooning individually.

Referring to FIG. 16(*a*)-(*b*), a process in which a single group G is divided into a plurality of subgroups SG1, SG2, SG3 and each subgroup perform platooning individually is shown.

The leader vehicle can provide a control signal to the first to fifth follower vehicles 102, 103, 104, 105, and 106 to perform platooning.

The group G can include a leader vehicle and first to fifth follower vehicles 102, 103, 104, 105, and 106.

The leader vehicle may measure the communication level of the group G, and may divide the group G into a first subgroup SG1, a second subgroup SG2, and a third subgroup SG3 when the measured communication level is determined to be equal to or less than a preset fourth reference value.

The leader vehicle can designate two or more vehicles among all the vehicles included in the group G as a sub-leader vehicle. For example, in the situation where the group G is divided into a plurality of subgroups, the leader vehicle can determine preset vehicles as a sub-leader vehicle. The leader vehicle can transmit a signal indicating the destination of the group (G) to a plurality of sub-leader vehicles. Thus, the sub-leader vehicle of the plurality of subgroups can determine the destination of the group G before being divided.

In the embodiment of the drawings, the leader vehicle 101 may determine the leader vehicle itself 101, the first follower vehicle 102, and the second follower vehicle 103 as a sub-leader vehicle.

The leader vehicle may determine the follower vehicles included in each subgroup. For example, when the group G is divided into subgroups, the leader vehicle may determine preset vehicles as a follower vehicle.

In the embodiment of the drawing, the leader vehicle can provide a control signal so that the leader vehicle itself and the third follower vehicle can form the first subgroup SG1, the first follower vehicle 102 and the fourth follower vehicle can form the second subgroup SG2, and the second follower vehicle 103 and the fifth follower vehicle may form the third subgroup SG3.

The first subgroup SG1 may include the leader vehicle and the third follower vehicle. The sub-leader vehicle of the first sub group SG1 is the leader vehicle. Thus, the leader vehicle may control the third follower vehicle by providing a control signal to the third follower vehicle. The leader vehicle and the third follower vehicle can perform platooning to a preset destination of the group G before being divided.

The second subgroup SG2 can include the first follower vehicle and the fourth follower vehicle. The sub-leader vehicle of the second sub group SG2 is the first follower vehicle. Thus, the first follower vehicle may control the fourth follower vehicle by providing a control signal to the fourth follower vehicle. The first follower vehicle and the fourth follower vehicle may perform platooning to the preset destination of the group G before being divided.

The third subgroup SG3 can include the second follower vehicle and the fifth follower vehicle. The sub-leader vehicle of the third sub group SG3 is the second follower vehicle. Thus, the second follower vehicle can control the fifth follower vehicle by providing a control signal to the fifth follower vehicle. The second follower vehicle and the fifth follower vehicle may perform platooning to the preset destination of the group G before being divided.

The first subgroup SG1, the second subgroup SG2, and the third subgroup SG3 can perform platooning individually and move to the same destination. The destination of the first sub-group SG1, the second sub-group SG2 and the third sub-group SG3 can be the destination of the group G before being divided.

Figure 17:
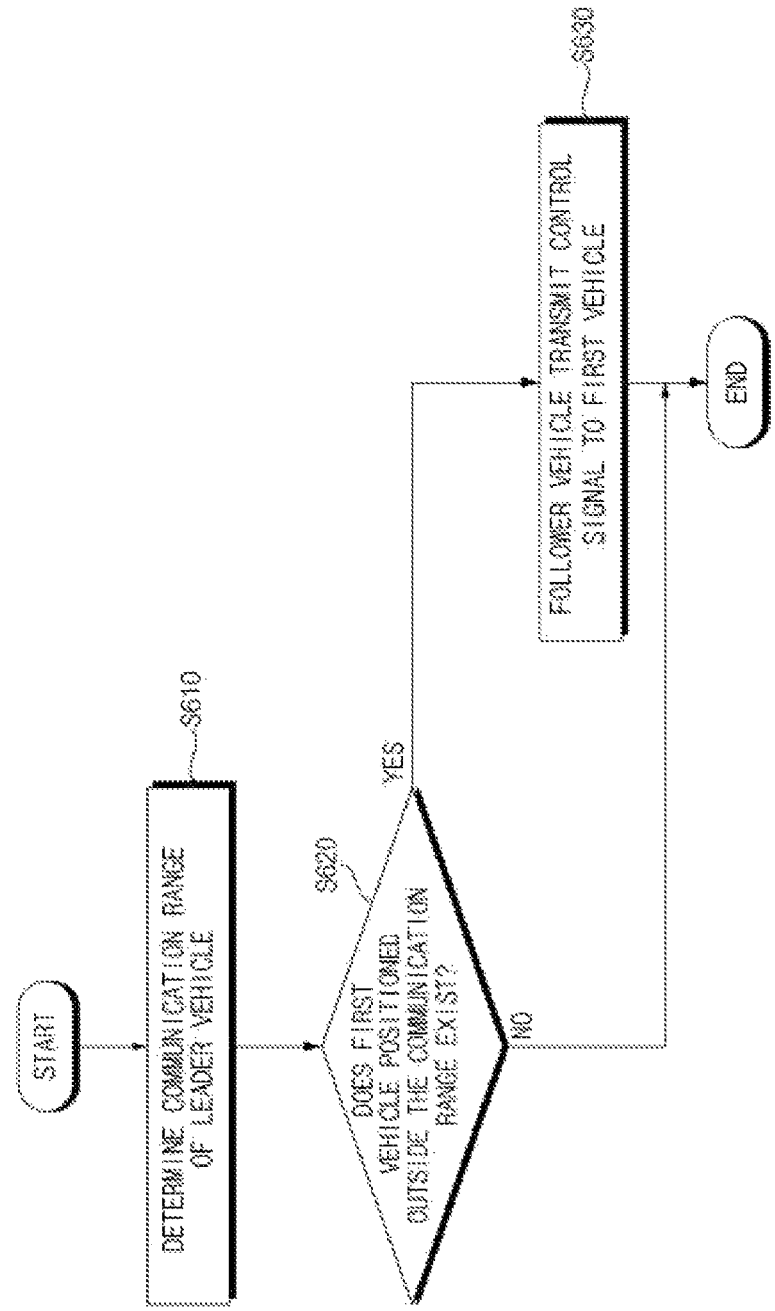
FIG. 17 and FIG. 18(a)-(b) are diagrams illustrating a process in which a follower vehicle transmits a control signal provided by a leader vehicle to other follower vehicle, in a platooning method according to an embodiment of the present invention.
Figure 18:
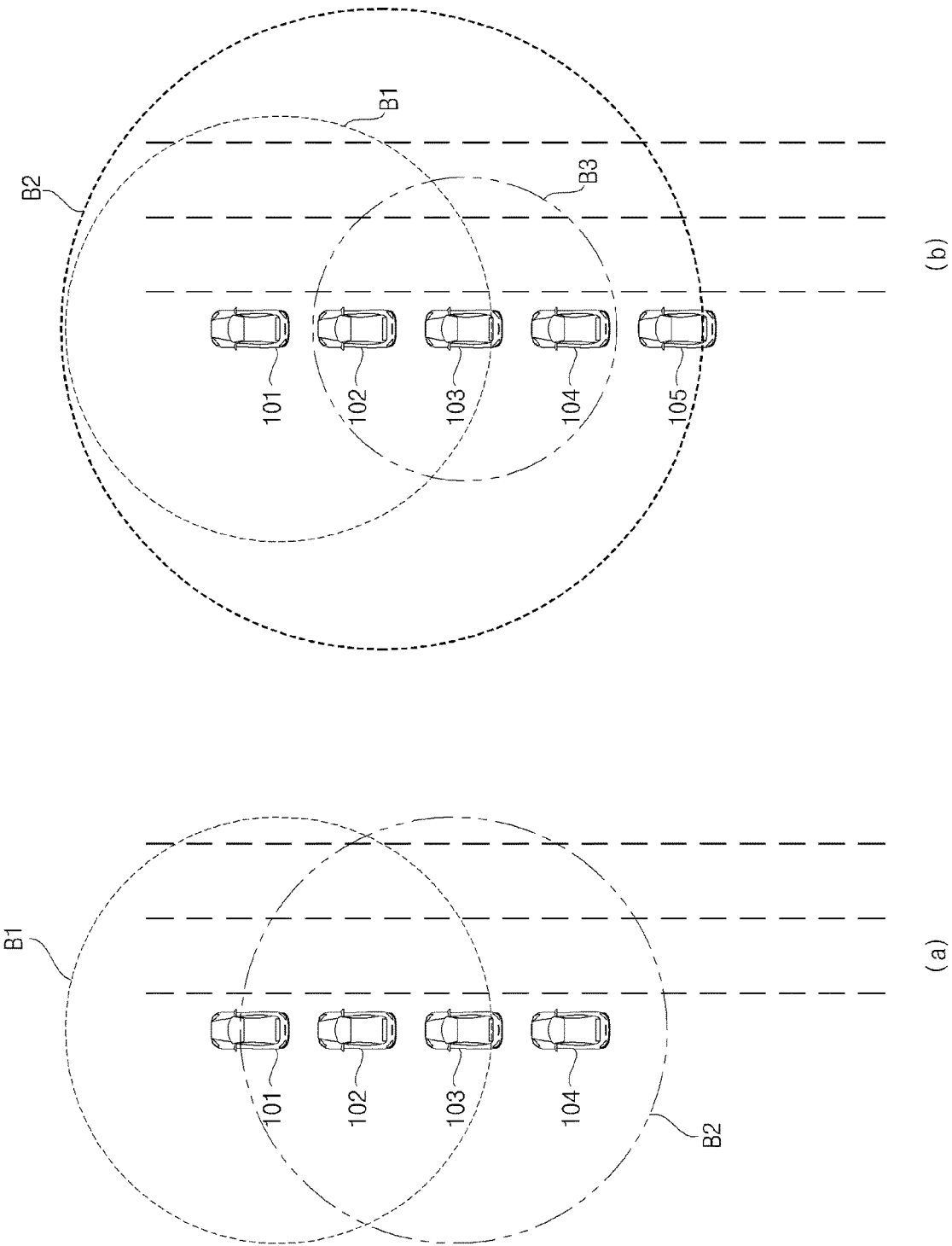

FIG. 17 and FIG. 18 are diagrams illustrating a process in which a follower vehicle transmits a control signal provided by a leader vehicle to other follower vehicle, in a platooning method according to an embodiment of the present invention.

Referring to FIG. 17, the follower vehicle of the group can transmit a control signal transmitted by the leader vehicle to other follower vehicle.

The leader vehicle can determine the communication range of the leader vehicle (S610).

The communication range may be a range to which the control signal transmitted by the leader vehicle is transmitted. The communication range may be a preset range. The communication range may be a value determined by experiment.

The leader vehicle can determine whether a vehicle (hereinafter referred to as 'first vehicle') positioned outside the communication range of the leader vehicle exists among the plurality of follower vehicles (S620).

The leader vehicle can determine the position of the plurality of follower vehicles, based on data transmitted by the plurality of follower vehicles.

When it is determined that a first vehicle positioned outside the communication range of the leader vehicle exists among the plurality of follower vehicles, the leader vehicle can transmit a second control signal which enables a follower vehicle positioned within the communication range of the leader vehicle to relay a control signal to the first vehicle.

The second control signal is a signal for instructing the follower vehicle, which has received the control signal transmitted by the leader vehicle, to transmit the received control signal to other follower vehicle.

The follower vehicle receiving the second control signal may transmit the control signal transmitted by the leader vehicle to the first vehicle (S630).

The follower vehicle positioned outside the communication range of the leader vehicle may not properly receive the control signal transmitted by the leader vehicle. Therefore, in the platooning method of the present invention, the follower vehicle positioned within the communication range of the leader vehicle may transmit the control signal of the leader vehicle to the follower vehicle positioned outside the communication range of the leader vehicle.

Referring to FIG. 18(a), among the plurality of follower vehicles positioned within the communication range of the leader vehicle, the vehicle closest to the first vehicle may relay the control signal.

Within a communication range B1 of the leader vehicle 101, the first follower vehicle 102 and the second follower vehicle 103 can be positioned.

The third follower vehicle 104 may exist outside the communication range B1 of the leader vehicle 101.

The leader vehicle 101 can determine that the third follower vehicle 104 is positioned outside the communication range B1 of the leader vehicle 101, based on the data transmitted by the third follower vehicle 104.

The leader vehicle 101 can determine that the second follower vehicle 103 is positioned close to the third follower vehicle 104, among the first follower vehicle 102 and the second follower vehicle 103 positioned in the communication range B1 of the leader vehicle 101.

The leader vehicle 101 can transmit the second control signal to the second follower vehicle 103 so that the second follower vehicle 103 can relay the control signal transmitted by the leader vehicle 101 to the third follower vehicle 104.

The second follower vehicle 103 may relay the control signal transmitted by the leader vehicle 101 to the third follower vehicle 104 when the second control signal is received. Since the third follower vehicle 104 is positioned outside the communication range B1 of the leader vehicle 101, it is difficult to receive the control signal transmitted by the leader vehicle 101. However, since the third follower vehicle 104 is positioned within the communication range B2 of the second follower vehicle 103, it is possible to relatively accurately receive the control signal relayed by the second follower vehicle 103.

Referring to FIG. 18(b), among the plurality of follower vehicles positioned within the communication range B1 of the leader vehicle 101, a vehicle (hereinafter, referred to as 'second vehicle') having the largest communication range may broadcast a control signal from the middle of the rank of the group.

The plurality of follower vehicles may transmit information on their own communication range to the leader vehicle 101 respectively.

Thus, the leader vehicle 101 can determine the communication range of each of the plurality of follower vehicles. In the embodiment of the drawing, the leader vehicle 101 can determine the communication range B2 of the first follower vehicle 102 and the communication range B3 of the second follower vehicle 103.

When there is a follower vehicle positioned outside the communication range B1 of the leader vehicle 101, among the plurality of followers positioned within the communication range B1 of the leader vehicle 101, the leader vehicle 101 can control the second vehicle having the largest communication range to move to the middle of the rank of the group.

In the embodiment of the drawing, the leader vehicle 101 can determine that the communication range B2 of the first follower vehicle 102 is larger than the communication range B3 of the second follower vehicle 103, thereby determining the first follower vehicle 102 as the second vehicle. The leader vehicle 101 may determine that the first follower vehicle 102 is already positioned in the center of the rank of the group, thereby not transmitting a control signal for moving the first follower vehicle 102.

The leader vehicle 101 may control the second vehicle to broadcast a control signal in the middle of the rank of the group. In the embodiment of the drawing, the leader vehicle 101 may control the first follower vehicle 102 to transmit a control signal.

The second vehicle may move to the middle of the rank of the group under the control of the leader vehicle 101 and broadcast the control signal transmitted by the leader vehicle 101. In the drawing, the first follower vehicle 102 can broadcast a control signal. Thus, the control signal of the leader vehicle can be transmitted over larger range.

Figure 19:
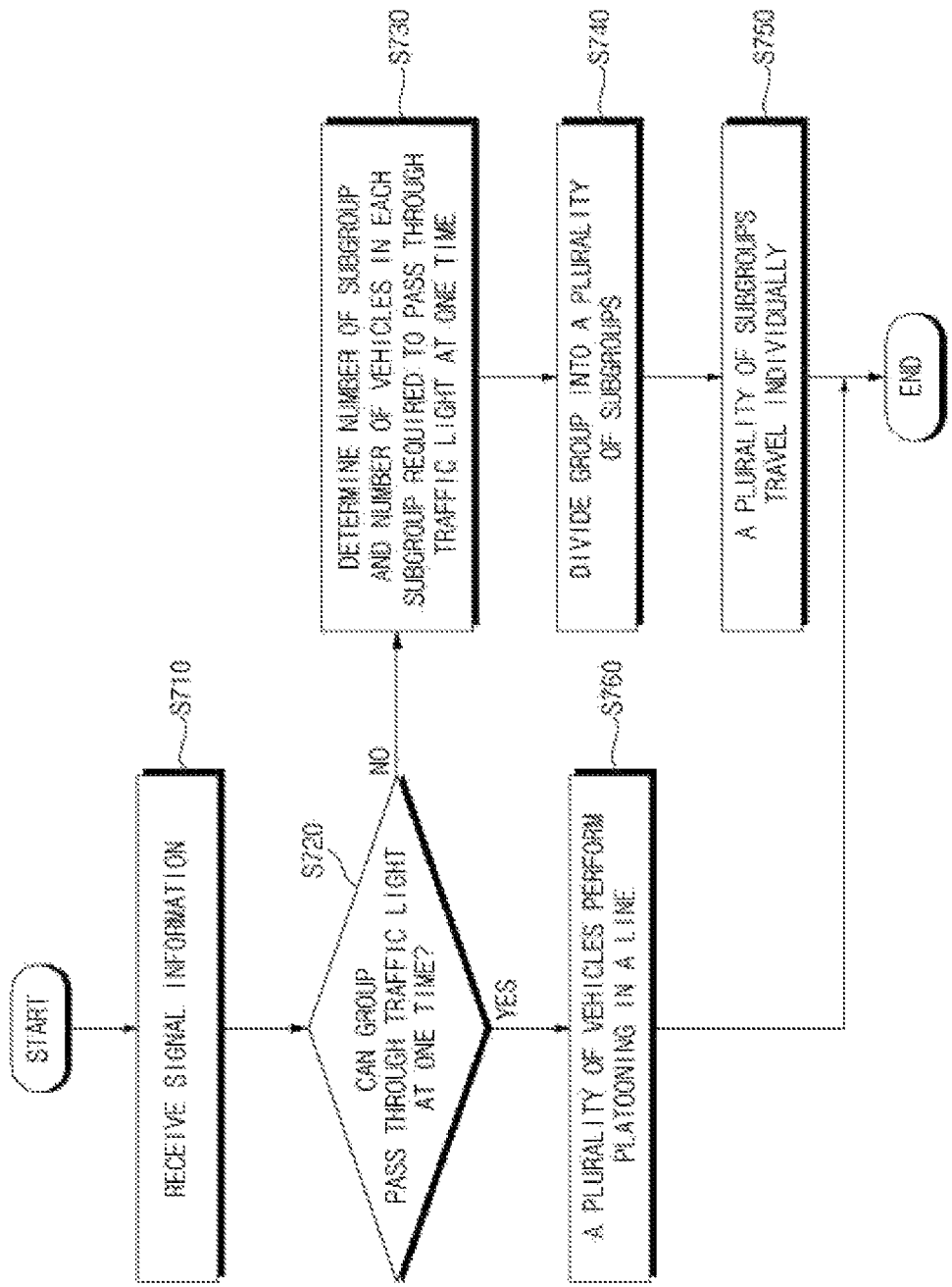
FIG. 19 and FIG. 20(a)-(b) are diagrams illustrating a process in which a single group is divided into a plurality of subgroups to pass through a traffic light at one time, in a platooning method according to an embodiment of the present invention.
Figure 20:
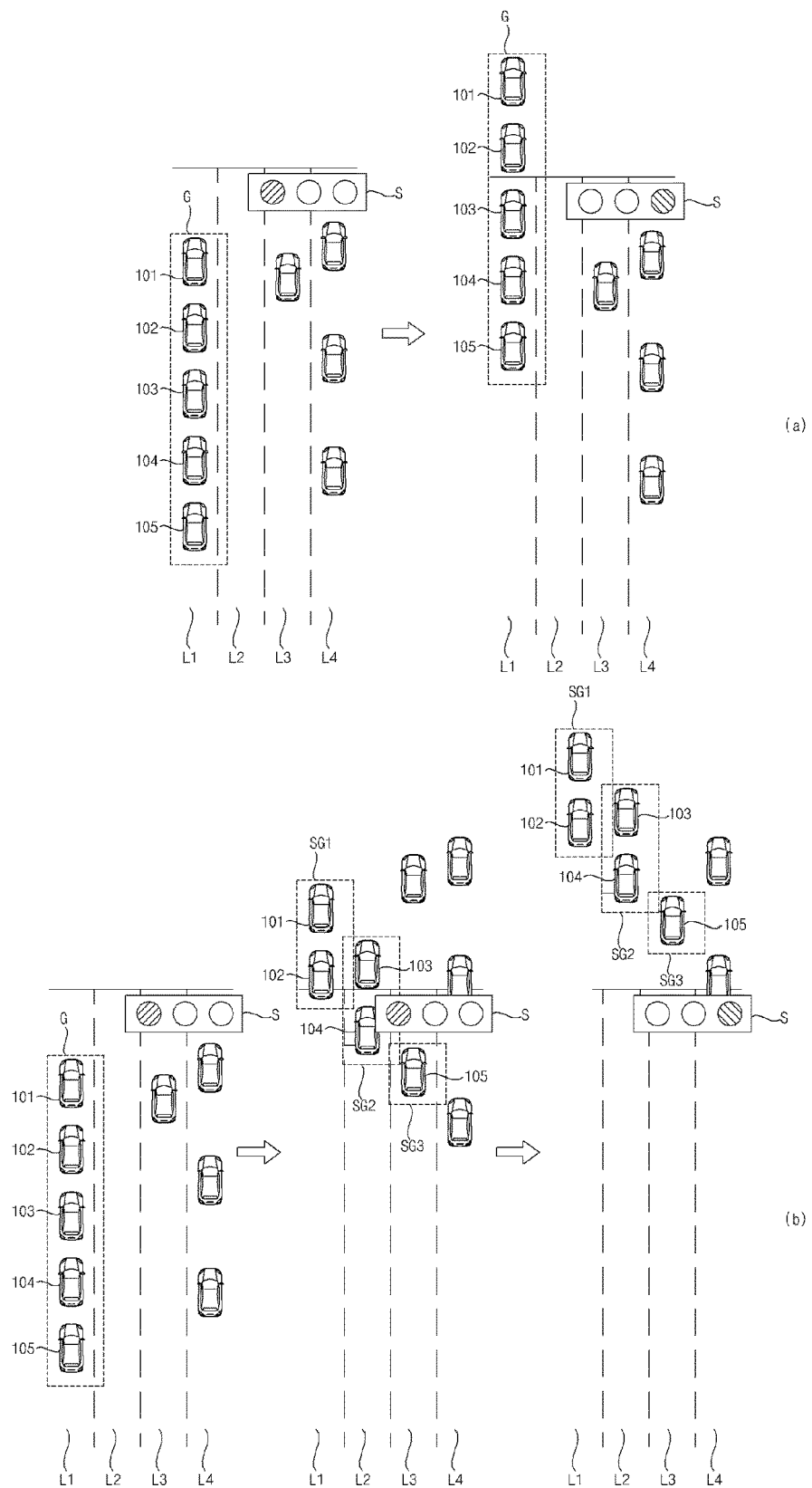

FIG. 19 and FIG. 20 are diagrams illustrating a process in which a single group is divided into a plurality of subgroups to pass through a traffic light at one time, in a platooning method according to an embodiment of the present invention.

The leader vehicle can receive signal information of a traffic light installed in a section through which the group passes (S710).

The traffic light or other infrastructure installed on the road can transmit information (signal information) on a signal of traffic light.

The leader vehicle can determine, based on the signal information, the time at which a pass signal of the traffic light is turned on, the time at which a stop signal is turned on, and the like.

The leader vehicle can determine whether all the vehicles in the group can pass the traffic light at one time, based on the signal information and the length and position of the group (S720).

In the embodiment of FIG. 20(a)-(b), the group G includes five vehicles 101, 102, 103, 104, and 105. The length of the group G corresponds to the length of the five vehicles 101, 102, 103, 104, and 105 arranged in a line.

Since the group G has a form in which a plurality of vehicles 101, 102, 103, 104, and 105 are arranged in a line, the time required for the group G to pass through the traffic light corresponds to the time required for the plurality of vehicles 101, 102, 103, 104, 104, and 105 to pass through the traffic light using a single lane.

Further, when a plurality of vehicles pass through a traffic light using a plurality of lanes, it is possible to pass through the traffic light relatively quickly in comparison with the situation where a plurality of vehicles use only a single lane.

When the plurality of vehicles 101, 102, 103, 104, and 105 perform platooning, if a stop signal is turned on in the state in which not all the vehicles 101, 102, 103, 104, and 105 included in the group G pass through the traffic light, a problem occurs that some of the vehicles 103, 104, and 105 included in the group G cannot pass through the traffic light.

Accordingly, in the platooning method of the present invention, all the vehicles 101, 102, 103, 104, and 105 included in the group G are able to pass through the traffic light at one time when the group G passes through the traffic light.

When it is determined that it is not possible to pass through the traffic light at one time, the leader vehicle 101 can divide the group into a plurality of subgroups, and the plurality of subgroups may perform platooning individually (S730 to S750).

The leader vehicle 101 may determine the number of subgroup, the number of vehicles included in each of the plurality of subgroups, and the position of each of the plurality of subgroups which are required for all the vehicles in the group to pass through the traffic light S at one time, based on the number of vehicles included in the group, the traffic situation by lane, and the time of pass signal (S730).

The time of pass signal can include a time at which the pass signal of the traffic light S is turned on and a time at which the pass signal of the traffic light S is turned off. Information on the pass time can be included in signal information transmitted by the traffic light S.

Referring to FIG. 20(b), there are four lanes on the road, and the traffic situation of each lane can be different from each other.

The group G travels in a first lane L1, no vehicle exists in a second lane L2, a single other vehicle exists in a third lane L3, and three other vehicles exist in a fourth lane L4.

The traffic situation by lane may include the number of other vehicles existing in each lane, and the position of other vehicle in the lane.

The leader vehicle 101 may determine the traffic situation by lane, based on around situation information. The leader vehicle 101 may determine that no vehicle exists in the second lane L2, a single other vehicle exists in the third lane L3, and three other vehicles exist in the fourth lane L4, based on around situation information. The leader vehicle 101 can also determine the position of other vehicles existing in the third and fourth lanes L3 and L4, based on the around situation information.

Based on the number of vehicles included in the group G, the traffic situation by lane, and the time of pass signal, the leader vehicle 101 can determine that the first subgroup SG1 formed of two vehicles should travel on the first lane L1, the second subgroup SG2 formed of two vehicles should travel on the second lane L2, and the third sub group SG3 formed of a single vehicle should travel on the third lane L3 to pass through the traffic light S at one time.

The leader vehicle 101 can divide the group G into a plurality of subgroups, based on the determined number of subgroups and the number of vehicles for each of a plurality of subgroups (S740).

The process of dividing the group G into a plurality of subgroups does not mean the process in which the vehicles included in the group move physically, but means the process of determining a specific vehicle and a specific subgroup when the specific vehicle is included the specific subgroup.

Referring to FIG. 20(b), the leader vehicle 101 may determine that the leader vehicle 101 itself and the first follower vehicle 102 form the first subgroup SG1, the second follower vehicle 103 and the third follower vehicle 103 form the second subgroup SG2, and the fourth follower vehicle 105 forms the third subgroup SG3, thereby dividing a single group into three subgroups.

The plurality of subgroups may travel individually, based on the position of each of the plurality of subgroups (S750).

Referring to FIG. 20(b), the leader vehicle 101 may control all the follower vehicles so that the first subgroup SG1 can be positioned in the first lane L1, the second subgroup SG2 can be positioned in the second lane L2, and the third sub group SG3 can be positioned in the third lane L3. The follower vehicles can move to a determined position under the control of the leader vehicle 101. Accordingly, the first subgroup SG1 may be positioned in the first lane L1, the second subgroup SG2 may be positioned in the second lane L2, and the third sub group SG3 may be positioned in the third lane L3.

The leader vehicle 101 can control the plurality of subgroups to travel individually, when the plurality of subgroups are positioned on a designated lane.

Thereafter, the leader vehicle 101 can become the sub-leader vehicle of the first subgroup SG1 and control the first follower vehicle 102. The first subgroup SG1 can perform platooning in the first lane L1 under the control of the leader vehicle 101.

The second follower vehicle 103 can become the sub-leader vehicle of the second sub group SG2 and control the third follower vehicle 104. The second subgroup SG2 may perform platooning in the second lane L2 under the control of the second follower vehicle 103.

The fourth follower vehicle 105 may travel individually in the third lane L3.

When it is determined that all the vehicles of the group are able to pass through the traffic light at one time, the leader vehicle can provide a control signal so that a plurality of vehicles included in the group may perform platooning in a line (S760).

In this instance, the plurality of vehicles included in the group may perform platooning in a line and pass through the traffic light.

The present invention described above can be implemented as computer readable codes on a medium on which a program is recorded. The computer readable medium includes all kinds of recording devices in which data that can be read by a computer system is stored. Examples of the computer readable medium include a hard disk drive (HDD), a solid state disk (SSD), a silicon disk drive (SDD), a ROM, a RAM, a CD-ROM, a magnetic tape, a floppy disk, and may also be implemented in the form of a carrier wave (e.g., transmission over the Internet). In addition, the computer may include a processor or a controller. Accordingly, the above detailed description is to be considered in all respects as illustrative and not restrictive.

What is claimed is:

1. A method for vehicle platooning in which a leader vehicle of a group of vehicles provides a control signal and one or more follower vehicles in the group of vehicles travel according to the control signal, the method comprising:
    determining a communication state of the group of vehicles by determining a communication level of the group of vehicles indicating a degree of communication quality; and
    adjusting, by the leader vehicle, a distance between at least two vehicles included in the group of vehicles based on the communication state of the group of vehicles,
    wherein the method further comprises:
        setting, by the leader vehicle, a reference value for a number of vehicles in the group based on the communication level; and
        transmitting a first control signal, by the leader vehicle, to vehicles in the group to adjust the vehicles included in the group to be less than or equal to the reference value, and
    wherein transmitting the first control signal comprises:
        transmitting a second control signal for traveling individually to a destination of the group to follower vehicles within the group that exceed the reference value.

2. The method according to claim 1, wherein the determining a communication state of the group of vehicles comprises:
    determining communication levels of a plurality of vehicles included in the group of vehicles; and
    determining an average value of the communication levels for the plurality of vehicles or a minimum value of the communication levels of the plurality of vehicles as the communication level of the group of vehicles.

3. The method according to claim 2, further comprising:
    transmitting a third control signal, by the leader vehicle, to a vehicle having a communication level less than or equal to a preset reference value among the plurality of vehicles included in the group for withdrawing from the group and traveling individually to a destination.

4. The method according to claim 1, wherein the determining a communication level comprises:
    determining a communication level of the group by the leader vehicle or a road infrastructure.

5. The method according to claim 1, wherein the adjusting a distance between the vehicles comprises:
    adjusting a distance between vehicles in the group of vehicles to be inversely proportional to the communication level by increasing the distance between the vehicles as the communication level is degraded.

6. The method according to claim 5, wherein the adjusting a distance between the vehicles comprises:
    adjusting the distance between the vehicles to a preset first distance, when the communication level is determined to be greater than or equal to a first reference value;
    adjusting the distance between the vehicles to a second distance larger than the first distance, when the communication level is less than the first reference value and greater than or equal to a second reference value; and
    transmitting a fourth control signal, by the leader vehicle, to the vehicles for withdrawing from the group and traveling individually to a destination when the communication level is determined to be less than the second reference value.

7. The method according to claim 1, further comprising:
    setting, by the leader vehicle, a platooning area that is a virtual zone restricting positions of vehicles included in the group based on the communication level; and
    performing platooning within the platooning area by the vehicles included in the group.

8. The method according to claim 7, further comprising:
    setting a size of the platooning area in proportion to the communication level; and
    transmitting a fifth control signal, by the leader vehicle, to vehicles in the group that are positioned outside of the platooning area for withdrawing from the group and traveling individually to a destination, when the platooning area is adjusted or when a distance between vehicles in the group is adjusted.

9. The method according to claim 1, further comprising:
    dividing the group into a plurality of subgroups, when the communication level is determined to be less than or equal to a preset reference value, and
    performing platooning individually by each of the plurality of subgroups.

10. The method according to claim 9, wherein each of the plurality of subgroups includes a single sub-leader vehicle and one or more follower vehicles, respectively, and each of the plurality of subgroups have a same destination, and
    wherein each single sub-leader vehicle in the plurality of subgroups transmits a sixth control signal to follower vehicles within the corresponding subgroup to which each single sub-leader vehicle belongs.

11. The method according to claim 1, further comprising:
    determining a communication range of the leader vehicle; and
    relaying a sixth control signal to a first vehicle in the group by a follower vehicle positioned within the communication range of the leader vehicle, when the first vehicle is positioned outside of the communication range of the leader vehicle.

12. The method according to claim 11, wherein the relaying the sixth control signal comprises:
    relaying the sixth control signal by a vehicle closest to the first vehicle, among a plurality of follower vehicles within the group of vehicles that are positioned within the communication range of the leader vehicle.

13. The method according to claim 11, wherein the relaying the sixth control signal comprises:
    broadcasting the sixth control at a predetermined position in the group by a second vehicle having a largest communication range, among a plurality of follower vehicles within the group of vehicles that are positioned within the communication range of the leader vehicle.

14. A method for vehicle platooning in which a leader vehicle of a group of vehicles provides a control signal and one or more follower vehicles in the group of vehicles travel according to the control signal, the method comprising:
    determining a communication state of the group of vehicles; and adjusting, by the leader vehicle, a distance between at least two vehicles included in the group of vehicles based on the communication state of the group of vehicles, wherein the method further comprises:
- receiving, by the leader vehicle, signal information of a traffic light installed in a section through which the group is expected to pass, the signal information including an amount of time for passing through the traffic light during one interval of the traffic light;
- determining, by the leader vehicle, whether all vehicles in the group are able to pass through the traffic light during the one interval of the traffic light based on the signal information, a length of the group and a position of the group;
- based on the determination that all vehicles in the group are able to pass through the traffic light during the one interval of the traffic light, transmitting, by the leader vehicle, a control signal to vehicles in the group to pass through the traffic light; and
- based on the determination that all vehicles in the group are not able to pass through the traffic light during the one interval of the traffic light, dividing, by the leader vehicle, the group into a plurality of subgroups, and individually performing platooning by the plurality of subgroups, and wherein the individually performing platooning by the plurality of subgroups comprises:
- determining a number of subgroups for the plurality of subgroups, a number of vehicles included in each of the plurality of subgroups, and a position of each of the plurality of subgroups, for allowing all vehicles in the group to pass through the traffic light during the one interval of the traffic light; and
- dividing the group into the plurality of subgroups, based on the determined number of subgroups and the number of vehicles for each of a plurality of subgroups, and
- traveling individually by the plurality of subgroups through the traffic light, based on the position of each of the plurality of subgroups.

15. The method according to claim 14, wherein the determining a number of subgroups for the plurality of subgroups comprises:
- determining the number of subgroups, the number of vehicles included in each of the plurality of subgroups, and the position of each of the plurality of subgroups, based on the number of vehicles included in the group, a traffic situation by lane, and the amount of time for passing through the traffic light during the one interval of the traffic light.

16. A leader vehicle for performing platooning by controlling one or more follower vehicles, the vehicle comprising:
- a processor configured to:
  - transmit a control signal to the one or more follower vehicles to perform platooning with the leader vehicle through a communication unit,
  - determine a communication state between the leader vehicle and the one or more follower vehicles by determining a communication level of the group of vehicles indicating a degree of communication quality,
  - adjust a distance between vehicles among the one or more follower vehicles, based on the communication state,
  - set a reference value for a number of vehicles in the group based on the communication level, and
  - transmit a first control signal to vehicles in the group to adjust the vehicles included in the group to be less than or equal to the reference value, and
- wherein the processor is further configured to:
  - transmit a second control signal for traveling individually to a destination of the group to follower vehicles within the group that exceed the reference value.

\* \* \* \* \*